(12) United States Patent
Rich et al.

(10) Patent No.: US 10,066,877 B2
(45) Date of Patent: Sep. 4, 2018

(54) HIGH EFFICIENCY VENTILATION SYSTEM

(71) Applicants: David Rich, Town and Country, MO (US); Kevin Krimmel, Wildwood, MO (US)

(72) Inventors: David Rich, Town and Country, MO (US); Kevin Krimmel, Wildwood, MO (US)

( * ) Notice: Subject to any disclaimer, the term of this patent is extended or adjusted under 35 U.S.C. 154(b) by 0 days.

(21) Appl. No.: 15/859,688

(22) Filed: Jan. 1, 2018

(65) Prior Publication Data

US 2018/0120035 A1 May 3, 2018

Related U.S. Application Data

(62) Division of application No. 14/542,574, filed on Nov. 15, 2014, now Pat. No. 9,891,005.

(51) Int. Cl.
*F24F 12/00* (2006.01)
*F28D 19/04* (2006.01)
*F28D 15/02* (2006.01)

(52) U.S. Cl.
CPC .......... *F28D 19/041* (2013.01); *F24F 12/003* (2013.01); *F24F 12/006* (2013.01); *H05K 999/99* (2013.01); *F28D 15/0208* (2013.01); *Y02B 30/52* (2013.01); *Y02B 30/563* (2013.01)

(58) Field of Classification Search
CPC ........ F24F 12/00; F24F 12/003; F24F 12/001; F24F 1/0007; F24F 2012/0076; F28D 19/041; F28D 15/0208; F25B 2313/021
USPC .......................................................... 62/272
See application file for complete search history.

(56) References Cited

U.S. PATENT DOCUMENTS

| | | | |
|---|---|---|---|
| 5,579,647 A * | 12/1996 | Calton | F24F 3/1411 62/223 |
| 6,119,388 A | 9/2000 | Jones et al. | |
| 6,199,388 B1 * | 3/2001 | Fischer, Jr. | F24F 3/1411 62/271 |
| 6,675,601 B2 * | 1/2004 | Ebara | F24F 3/1423 62/271 |
| 7,076,962 B2 | 7/2006 | He et al. | |

(Continued)

FOREIGN PATENT DOCUMENTS

JP 2009208001 A * 9/2009

OTHER PUBLICATIONS

Daikin AC, Variable Refrigerant Volume Systems, 2006.
(Continued)

*Primary Examiner* — Frantz Jules
*Assistant Examiner* — Lionel Nouketcha
(74) *Attorney, Agent, or Firm* — Kevin P. Rollins

(57) ABSTRACT

A high efficiency ventilation system may include a partition configured to separate a supply air stream and a return air stream, an energy recovery ventilator, a heat recovery ventilator, a refrigerant flow controlling condensing unit, and a direct expansion coil. The refrigerant flow controlling condensing unit may be configured to send a refrigerant to the direct expansion coil and configured to receive a refrigerant from the direct expansion coil. The direct expansion coil may be disposed between the energy recovery ventilator and the heat recovery ventilator. The high efficiency ventilation system may be configured to supply ventilation air to a controlled environment at a particular temperature and a particular humidity.

20 Claims, 6 Drawing Sheets

(56) References Cited

U.S. PATENT DOCUMENTS

| | | | |
|---|---|---|---|
| 7,331,191 B2 | 2/2008 | He et al. | |
| 8,104,303 B2* | 1/2012 | Murata | F24F 1/26 29/890.035 |
| 8,337,184 B2 | 12/2012 | Hossain et al. | |
| 8,347,644 B2 | 1/2013 | Liu et al. | |
| 8,580,010 B2* | 11/2013 | Matsuba | B01D 53/06 62/94 |
| 2003/0074913 A1 | 4/2003 | Ebara | |
| 2004/0144112 A1 | 7/2004 | He et al. | |
| 2006/0218944 A1 | 10/2006 | He et al. | |
| 2010/0084483 A1* | 4/2010 | Pieper | F24F 3/1423 236/44 A |
| 2010/0131106 A1 | 5/2010 | Kriangkanont | |
| 2010/0229587 A1 | 9/2010 | Liu et al. | |
| 2011/0308265 A1* | 12/2011 | Phannavong | F24F 12/001 62/160 |
| 2013/0180266 A1 | 7/2013 | Bois | |

OTHER PUBLICATIONS

ASHRAE Addenda, Ventilation for Acceptable Indoor Air Quality, ISSN 1041-2336, 2006 Supplement.
DOE/GO-102001-1165, NREL/BK-710-29267, Desiccant Dehumidification, May 2001.
William Goetzler, Variable Refrigerant Flow Systems, ASHRAE Journal, Apr. 2007.
ECOi System Certified Efficiency Ratings, IEER Integrated Energy Efficiency Ratio.
Daikin, Individual branch selector for VRV heat recovery, BSVQ-P8.
Ammi Amarnath, Electric Power Research Institute, Morton Blatt, Energy Utilization Consultant, Variable Refrigerant Flow: An Emerging Air Conditioner and Heat Pump Technology, 2008 ACEEE Summer Study on Energy Efficiency in Buildings.
Updated ANSI/ASHRAE Standard for Commercial Ventilation Rate Procedure—Code Notes, http://resourcecenter.pnl.gov/cocoon/morf/ResourceCenter.
Greenheck, HVAC Control & Balancing Dampers Models VCD, MBD and RBD, Aug. 2013.
Daikin AC, VRVIII presentation.
Greenheck Fan Corp., Standard Direct Expansion Cooling Air Conditioning System, 2010.
Daikin AC, INCL, Engineering Data BSV-P Centralized Branch Selector units.
Annexair, Dual Wheel Unit with Cooling, Process Sheet.
Annexair, Dual Wheel Unit with Cooling and Heating, Process Sheet.
Annexair, Dual Wheel Unit with Heating and Cooling, Process Sheet.
HVAC Zoning Bypass Damper—More than you ever wanted to know, Posted on May 9, 2010 by zoningnews.
ICC IMC, International Mechanical Code, 2006.
J. Fischer, Active Dessicant-Based Preconditioning Market Analysis and Product Development, ORNL/SUB/94-SV004/2.
Greenheck, Energy Recovery Ventilators Models ERM, MiniVent, ERV and ERVe, Jun. 2013.
BLACH Construction, Presentation.
A. Bhatia, HVAC Variable Refrigerant Flow Systems.
SEMCO, Energy Recovery Wheel, Technical Guide.
Mark Rabbia, George Dowse, Carrier Corporation, Understanding Energy Wheels and Energy Recovery Ventilation Technology, Sep. 2000.

\* cited by examiner

HIGH EFFICIENCY VENTILATION SYSTEM

CROSS-REFERENCE TO RELATED APPLICATIONS

This Application is a divisional of prior application Ser. No. 14/542,574, filed Nov. 15, 2014.

FIELD OF THE INVENTION

The present disclosure relates to a system for heating, ventilation, and air conditioning, and, more particularly, to a high efficiency ventilation system.

BACKGROUND OF THE INVENTION

Modern heating, ventilation, and air conditioning systems are typically designed to adjust and maintain both a temperature and a humidity of a controlled environment. Some controlled environments, e.g., hospitals, primary schools, etc., require air ventilation in addition to temperature and humidity control. In the heating, ventilation, and air conditioning context, air ventilation is a process wherein air from a controlled environment is continuously replaced with outside air. Organizations such as the American Society of Heating, Refrigerating and Air-Conditioning Engineers have established minimum ventilation rate requirements for specific controlled environments. For example, a new elementary school may be required to ventilate 10.0 cubic feet of air per minute per elementary school occupant.

Compliance with minimum ventilation rate regulations generally increases an amount of energy required to maintain a desired temperature and a desired humidity within a controlled environment. For example, during summer conditions in many regions, a temperature and a humidity of outside air is greater than a desired temperature and a desired humidity within a controlled environment. Thus, continuously supplying outside air to the controlled environment may increase a temperature and a humidity of the controlled environment and additional energy is required to decrease the temperature and decrease the humidity of the controlled environment to the desired temperature and the desired humidity. Accordingly, there is a need to reduce an amount of additional energy required to comply with minimum ventilation rate regulations.

BRIEF SUMMARY OF THE INVENTION

A high efficiency ventilation system is presented. In one or more embodiments, a high efficiency ventilation system may comprise a partition configured to separate a supply air stream and a return air stream, an energy recovery ventilator, a heat recovery ventilator, a refrigerant flow controlling condensing unit, and a direct expansion coil. Illustratively, the refrigerant flow controlling condensing unit may be directly or indirectly connected to the direct expansion coil. In one or more embodiments, the refrigerant flow controlling condensing unit may be configured to facilitate a transfer of a refrigerant from the refrigerant flow controlling condensing unit to the direct expansion coil. Illustratively, the refrigerant flow controlling condensing unit may be configured to facilitate a transfer of a refrigerant from the direct expansion coil to the refrigerant flow controlling condensing unit. In one or more embodiments, the direct expansion coil may be disposed between the energy recovery ventilator and the heat recovery ventilator. Illustratively, the high efficiency ventilation system may be configured to ventilate a controlled environment. In one or more embodiments, the high efficiency ventilation system may be configured to supply ventilation air to the controlled environment at a particular temperature and a particular humidity.

BRIEF DESCRIPTION OF THE DRAWINGS

The above and further advantages of the present invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
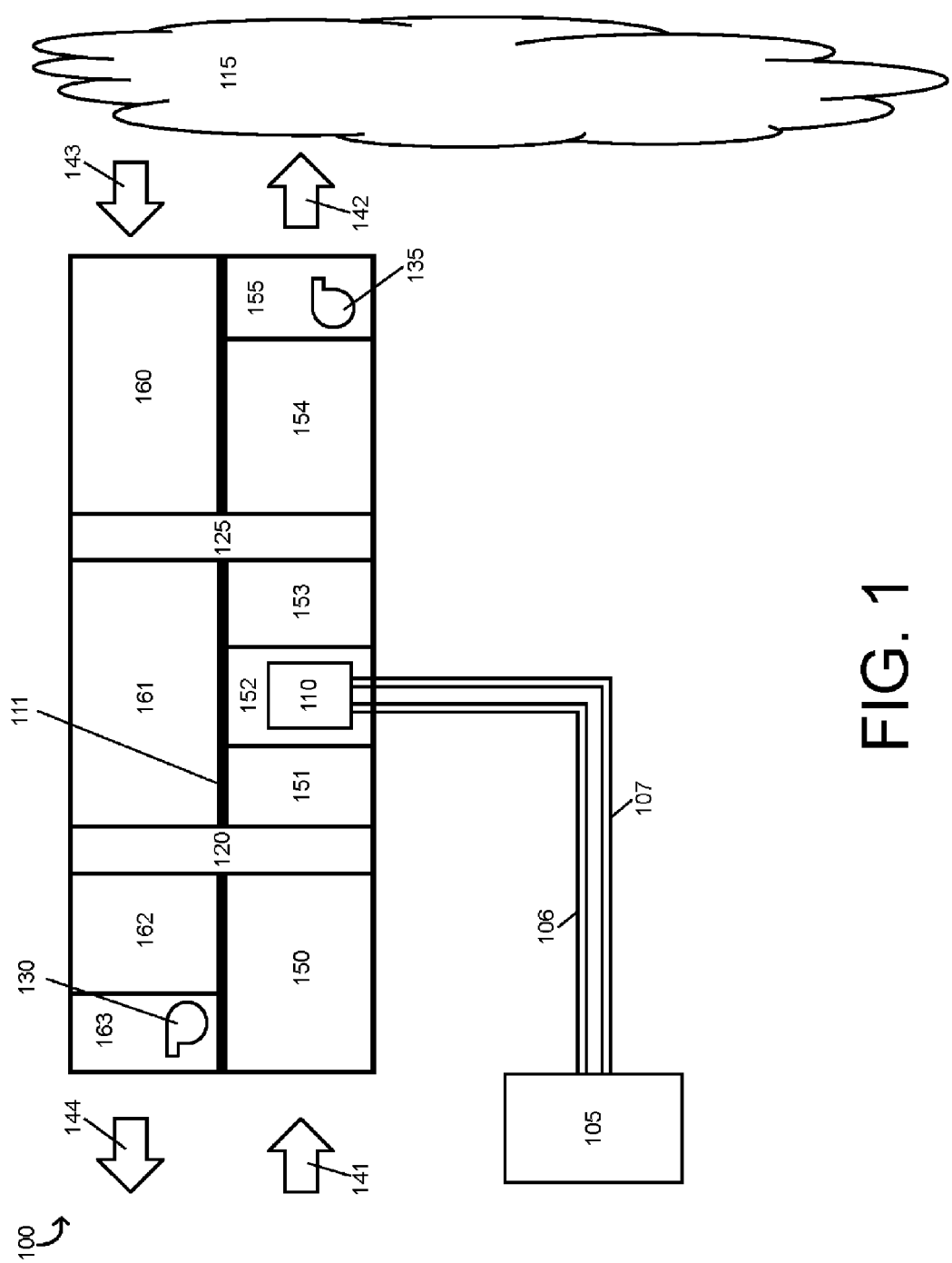
FIG. 1 is a schematic diagram illustrating a high efficiency ventilation system in a heat pump configuration.

FIG. 1 is a schematic diagram illustrating a high efficiency ventilation system in a heat pump configuration 100. Illustratively, high efficiency ventilation system in a heat pump configuration 100 may be configured to ventilate a controlled environment 115 in accordance with American Society of Heating, Refrigerating and Air-Conditioning Engineers required minimum ventilation rates. In one or more embodiments, high efficiency ventilation system in a heat pump configuration 100 may be configured to ventilate a controlled environment 115 in accordance with International Mechanical Code required minimum ventilation rates. Illustratively, high efficiency ventilation system in a heat pump configuration 100 may be configured to ventilate a controlled environment 115, e.g., high efficiency ventilation system in a heat pump configuration 100 may be configured to supply air at a controlled temperature and humidity to controlled environment 115 via a supply air stream 142. In one or more embodiments, high efficiency ventilation system in a heat pump configuration 100 may be configured to control a temperature and a humidity of a controlled environment 115, e.g., high efficiency ventilation system in a heat pump configuration 100 may be configured to control a temperature and a humidity of controlled environment 115 via supply air stream 142. Illustratively, high efficiency ventilation system in a heat pump configuration 100 may be configured to ventilate a controlled environment 115, e.g., high efficiency ventilation system in a heat pump configuration 100 may be configured to remove air from controlled environment 115 via a return air stream 143. In one or more embodiments, high efficiency ventilation system in a heat pump configuration 100 may be configured to control a temperature and a humidity of a controlled environment 115 via return air stream 143. Illustratively, supply air stream 142 and return air stream 143 may be separated by a partition 111, e.g., partition 111 may be configured to hermetically separate supply air stream 142 and return air stream 143.

In one or more embodiments, partition 111 may be configured to separate an outside air stream 141 and an exhaust air stream 144, e.g., partition 111 may be configured to hermetically separate outside air stream 141 and exhaust air stream 144. Illustratively, partition 111 may be configured to separate a first supply air zone 150, a second supply air zone 151, a third supply air zone 152, a fourth supply air zone 153, a fifth supply air zone 154, and a sixth supply air zone 155 from a first return air zone 160, a second return air zone 161, a third return air zone 162, and a fourth return air zone 163, e.g., partition 111 may be configured to hermetically separate a first supply air zone 150, a second supply air zone 151, a third supply air zone 152, a fourth supply air zone 153, a fifth supply air zone 154, and a sixth supply air zone 155 from a first return air zone 160, a second return air zone 161, a third return air zone 162, and a fourth return air zone 163.

In one or more embodiments, a portion of partition 111 may comprise a bypass damper configured to temporarily open a hermetically sealed barrier between supply air stream 142 and return air stream 143, e.g., a portion of partition 111 may comprise a bypass damper configured to temporarily facilitate an egress of air out from one or more supply air zones and an ingress of air into one or more return air zones or an egress of air out from one or more return air zones and an ingress of air into one or more supply air zones. Illustratively, a portion of partition 111 may comprise a bypass damper configured to facilitate a maintenance operation, a defrost operation, etc. In one or more embodiments, a portion of partition 111 may comprise a bypass damper disposed between first return air zone 160 and fifth supply air zone 154.

In one or more embodiments, high efficiency ventilation system in a heat pump configuration 100 may comprise a refrigerant flow controlling condensing unit 105, a direct expansion coil 110, an energy recovery ventilator 120, and a heat recovery ventilator 125. Illustratively, direct expansion coil 110 may be disposed between energy recovery ventilator 120 and heat recovery ventilator 125, e.g., direct expansion coil 110 may be disposed downstream of energy recovery ventilator 120 and upstream of heat recovery ventilator 125. In one or more embodiments, refrigerant flow controlling condensing unit 105 may be directly or indirectly connected to direct expansion coil 110 by a liquid line 106 and a gas and gas and suction line 107. Illustratively, liquid line 106 may comprise a pipe configured to facilitate a transfer of a refrigerant from refrigerant flow controlling condensing unit 105 to direct expansion coil 110. In one or more embodiments, gas and suction line 107 may comprise a pipe configured to facilitate a transfer of a refrigerant from direct expansion coil 110 to refrigerant flow controlling condensing unit 105. Illustratively, refrigerant flow controlling condensing unit 105 may comprise a variable refrigerant volume condensing unit configured to distribute a refrigerant to one or more coil units wherein each coil unit may be configured to control a temperature and a humidity of a conditioned space, e.g., refrigerant flow controlling condensing unit 105 may comprise a variable refrigerant volume condensing unit configured to distribute a refrigerant to one or more direct expansion coils 110. In one or more embodiments, refrigerant flow controlling condensing unit 105 may comprise a variable refrigerant flow condensing unit configured to distribute a refrigerant to one or more coil units wherein each coil unit may be configured to control a temperature and a humidity of a conditioned space, e.g., refrigerant flow controlling condensing unit 105 may comprise a variable refrigerant flow condensing unit configured to distribute a refrigerant to one or more direct expansion coils 110. Illustratively, refrigerant flow controlling condensing unit 105 may comprise a compressor, a fan, and a heat exchanger. In one or more embodiments, refrigerant flow controlling condensing unit 105 may comprise a refrigerant flow control system configured to control the distribution of a refrigerant to one or more coil units, e.g., refrigerant flow controlling condensing unit 105 may comprise a refrigerant flow control system configured to control the distribution of a refrigerant to one or more direct expansion coils 110. Illustratively, refrigerant flow controlling condensing unit 105 may be water cooled. In one or more embodiments, refrigerant flow controlling condensing unit 105 may be air cooled.

Illustratively, energy recovery ventilator 120 may be configured to recover sensible energy, e.g., energy recovery ventilator 120 may be configured for temperature recovery. In one or more embodiments, energy recovery ventilator 120 may be configured to recover latent energy, e.g., energy recovery ventilator 120 may be configured for moisture recovery. Illustratively, energy recovery ventilator 120 may be configured to recover sensible energy and latent energy. In one or more embodiments, energy recovery ventilator 120 may comprise an enthalpy wheel configured to recover sensible energy and latent energy. Illustratively, energy recovery ventilator 120 may comprise a sensible only energy recovery wheel configured to recover sensible energy. In one or more embodiments, energy recovery ventilator 120 may comprise an energy recovery wheel configured to recover sensible energy and latent energy. For example, energy recovery ventilator 120 may comprise an enthalpy wheel configured to recover sensible energy and latent energy. Illustratively, energy recovery ventilator 120 may comprise a desiccant wheel, e.g., energy recovery ventilator may comprise an active desiccant wheel or a passive desiccant wheel. In one or more embodiments, energy recovery ventilator 120 may comprise a desiccant molecular sieve coating configured to facilitate moisture absorption. Illustratively, energy recovery ventilator 120 may comprise a desiccant molecular sieve coating configured to prevent contamination of supply air stream 142, e.g., energy recovery ventilator 120 may comprise a desiccant molecular sieve coating configured to minimize cross-contamination of return air stream 143 pollutants into supply air stream 142. In one or more embodiments, energy recovery ventilator 120 may comprise a desiccant molecular sieve coating having a plurality of apertures wherein each aperture of the plurality of apertures has an aperture diameter in a range of 0.25 to 4.0 angstroms, e.g., energy recovery ventilator 120 may comprise a desiccant molecular sieve coating having a plurality of apertures wherein each aperture of the plurality of apertures has an aperture diameter of 3.0 angstroms. Illustratively, energy recovery ventilator 120 may comprise a desiccant molecular sieve coating having a plurality of apertures wherein each apertures of the plurality of apertures has an aperture diameter less than 0.25 angstroms or greater than 4.0 angstroms. In one or more embodiments, energy recovery ventilator 120 may comprise any type of desiccant, e.g., energy recovery ventilator may comprise a silica gel desiccant, an oxidized aluminum desiccant, etc.

Illustratively, energy recovery ventilator 120 may comprise a fixed-plate heat exchanger, e.g., energy recovery ventilator 120 may comprise alternating layers of separated plates. In one or more embodiments, energy recovery ventilator 120 may comprise a fixed-plate heat exchanger in a cross-flow configuration. Illustratively, energy recovery ventilator 120 may comprise a fixed-plate heat exchanger in a counter-flow configuration. In one or more embodiments, energy recovery ventilator 120 may comprise a fixed-plate heat exchanger having plates manufactured from a water vapor permeable material. Illustratively, energy recovery ventilator 120 may comprise a fixed-plate heat exchanger having plates manufactured from microporous polymeric membranes. In one or more embodiments, energy recovery ventilator 120 may comprise a heat pipe heat exchanger, e.g., energy recovery ventilator 120 may comprise a plurality of tubes wherein each tube comprises an internal capillary wick material. Illustratively, energy recovery ventilator 120 may comprise a thermosiphon heat exchanger, e.g., energy recovery ventilator 120 may comprise a plurality of sealed tubes. In one or more embodiments, energy recovery ventilator 120 may comprise a thermosiphon heat exchanger in a single coil configuration. Illustratively, energy recovery ventilator 120 may comprise a thermosiphon heat exchanger in a multiple coil configuration. In one or more embodiments, energy recovery ventilator 120 may comprise a coil energy recovery loop, e.g., energy recovery ventilator 120 may comprise a runaround loop.

Illustratively, energy recovery ventilator 120 may be configured to facilitate a heat transfer, e.g., energy recovery ventilator 120 may be configured facilitate a heat transfer between air streams separated by partition 111. In one or more embodiments, energy recovery ventilator 120 may be configured to facilitate a transfer of thermal energy, e.g., energy recovery ventilator 120 may be configured to facilitate a transfer of thermal energy by conduction, convection, radiation, advection, etc. Illustratively, energy recovery ventilator 120 may be configured to facilitate a heat transfer between outside air stream 141 and return air stream 143, e.g., energy recovery ventilator 120 may be configured to facilitate a transfer of thermal energy from outside air stream 141 to return air stream 143 or from return air stream 143 to outside air stream 141. During summer conditions, energy recovery ventilator 120 may be configured to facilitate a heat transfer between outside air stream 141 and return air stream 143, e.g., energy recovery ventilator 120 may be configured to facilitate a heat transfer by decreasing a temperature of outside air stream 141 and increasing a temperature of return air stream 143. During winter conditions, energy recovery ventilator 120 may be configured to facilitate a heat transfer between outside air stream 141 and return air stream 143, e.g., energy recovery ventilator 120 may be configured to facilitate a heat transfer by increasing a temperature of outside air stream 141 and decreasing a temperature of return air stream 143. In one or more embodiments, energy recovery ventilator 120 may be configured to facilitate a moisture transfer, e.g., energy recovery ventilator 120 may be configured to facilitate a moisture transfer between air streams separated by partition 111. Illustratively, energy recovery ventilator 120 may be configured to facilitate a transfer of moisture from outside air stream 141 to return air stream 143 or from return air stream 143 to outside air stream 141. During summer conditions, energy recovery ventilator 120 may be configured to facilitate a moisture transfer between outside air stream 141 and return air stream 143, e.g., energy recovery ventilator 120 may be configured to facilitate a moisture transfer by decreasing a humidity of outside air stream 141 and increasing a humidity of return air stream 143. During winter conditions, energy recovery ventilator 120 may be configured to facilitate a moisture transfer between outside air stream 141 and return air stream 143, e.g., energy recovery ventilator 120 may be configured to facilitate a moisture transfer by increasing a humidity of outside air stream 141 and decreasing a humidity of return air stream 143.

In one or more embodiments, energy recovery ventilator 120 may be configured to facilitate a heat transfer and a moisture transfer, e.g., energy recovery ventilator 120 may be configured to simultaneously facilitate a heat transfer and a moisture transfer between air streams separated by partition 111. During summer conditions, energy recovery ventilator 120 may be configured to facilitate a heat transfer and a moisture transfer between outside air stream 141 and return air stream 143, e.g., energy recovery ventilator 120 may be configured to facilitate a heat transfer and a moisture transfer by decreasing a temperature and decreasing a humidity of outside air stream 141 and increasing a temperature and increasing a humidity of return air stream 143. During winter conditions, energy recovery ventilator 120 may be configured to facilitate a heat transfer and a moisture transfer between outside air stream 141 and return air stream 143, e.g., energy recovery ventilator 120 may be configured to facilitate a moisture transfer by increasing a temperature and increasing a humidity of outside air stream 141 and decreasing a temperature and decreasing a humidity of return air stream 143. Illustratively, energy recovery ventilator 120 may be configured to recover sensible energy wherein outside air stream 141 may ingress first supply air zone 150 at a first temperature and outside air stream 141 may ingress second supply air zone 151 at a second temperature. In one or more embodiments, the second temperature of outside air stream 141 may be less than the first temperature of outside air stream 141, e.g., the second temperature of outside air stream 141 may be less than the first temperature of outside air stream 141 during summer conditions. Illustratively, the second temperature of outside air stream 141 may be greater than the first temperature of outside air stream 141, e.g., the second temperature of outside air stream 141 may be greater than the first temperature of outside air stream 141 during winter conditions. In one or more embodiments, energy recovery ventilator 120 may be configured to recover sensible energy wherein return air stream 143 may ingress second return air zone 161 at a first temperature and return air stream 143 may ingress third return air zone 162 at a second temperature. Illustratively, the second temperature of return air stream 143 may be less than the first temperature of return air stream 143, e.g., the second temperature of return air stream 143 may be less than the first temperature of return air stream 143 during winter conditions. In one or more embodiments, the second temperature of return air stream 143 may be greater than the first temperature of return air stream 143, e.g., the second temperature of return air stream 143 may be greater than the first temperature of return air stream 143 during summer conditions. Illustratively, energy recovery ventilator 120 may be configured to recover latent energy wherein outside air stream 141 may ingress first supply air zone 150 having a first moisture content and outside air stream 141 may ingress second supply air zone 151 having a second moisture content. In one or more embodiments, the second moisture content of outside air stream 141 may be less than the first moisture content of outside air stream 141, e.g., the second moisture content of outside air stream 141 may be less than the first moisture content of outside air stream 141 during summer conditions. Illustratively, the second moisture content of outside air stream 141 may be greater than the first moisture content of outside air stream 141, e.g., the second moisture content of outside air stream 141 may be greater than the first moisture content of outside air stream 141 during winter conditions. In one or more embodiments, energy recovery ventilator 120 may be configured to recover latent energy wherein return air stream 143 may ingress second return air zone 161 having a first moisture content and return air stream 143 may ingress third return air zone 162 having a second moisture content. Illustratively, the second moisture content of return air stream 143 may be less than the first moisture content of return air stream 143, e.g., the second moisture content of return air stream 143 may be less than the first moisture content of return air stream 143 during winter conditions. In one or more embodiments, the second moisture content of return air stream 143 may be greater than the first moisture content of return air stream 143, e.g., the second moisture content of return air stream 143 may be greater than the first moisture content of return air stream 143 during summer conditions.

Illustratively, heat recovery ventilator 125 may be configured to recover sensible energy, e.g., heat recovery ventilator 125 may be configured for temperature recovery. In one or more embodiments, heat recovery ventilator 125 may be configured to recover latent energy, e.g., heat recovery ventilator 125 may be configured for moisture recovery. Illustratively, heat recovery ventilator 125 may be configured to recover sensible energy and latent energy. In one or more embodiments, heat recovery ventilator 125 may comprise an enthalpy wheel configured to recover sensible energy and latent energy. Illustratively, heat recovery ventilator 125 may comprise a sensible only energy recovery wheel configured to recover sensible energy. In one or more embodiments, heat recovery ventilator 125 may comprise an active desiccant wheel or a passive desiccant wheel.

Illustratively, heat recovery ventilator 125 may comprise a fixed-plate heat exchanger, e.g., heat recovery ventilator 125 may comprise alternating layers of separated plates. In one or more embodiments, heat recovery ventilator 125 may comprise a fixed-plate heat exchanger in a cross-flow configuration. Illustratively, heat recovery ventilator 125 may comprise a fixed-plate heat exchanger in a counter-flow configuration. In one or more embodiments, heat recovery ventilator 125 may comprise a fixed-plate heat exchanger having plates manufactured from a water vapor permeable material. Illustratively, heat recovery ventilator 125 may comprise a fixed-plate heat exchanger having plates manufactured from microporous polymeric membranes. In one or more embodiments, heat recovery ventilator 125 may comprise a heat pipe heat exchanger, e.g., heat recovery ventilator 125 may comprise a plurality of tubes wherein each tube comprises an internal capillary wick material. Illustratively, heat recovery ventilator 125 may comprise a thermosiphon heat exchanger, e.g., heat recovery ventilator 125 may comprise a plurality of sealed tubes. In one or more embodiments, heat recovery ventilator 125 may comprise a thermosiphon heat exchanger in a single coil configuration. Illustratively, heat recovery ventilator 125 may comprise a thermosiphon heat exchanger in a multiple coil configuration. In one or more embodiments, heat recovery ventilator 125 may comprise a coil energy recovery loop, e.g., heat recovery ventilator 125 may comprise a runaround loop.

Illustratively, heat recovery ventilator 125 may be configured to facilitate a heat transfer, e.g., heat recovery ventilator 125 may be configured facilitate a heat transfer between air streams separated by partition 111. In one or more embodiments, heat recovery ventilator 125 may be configured to facilitate a transfer of thermal energy, e.g., heat recovery ventilator 125 may be configured to facilitate a transfer of thermal energy by conduction, convection, radiation, advection, etc. Illustratively, heat recovery ventilator 125 may be configured to facilitate a heat transfer between outside air stream 141 and return air stream 143, e.g., heat recovery ventilator 125 may be configured to facilitate a transfer of thermal energy from outside air stream 141 to return air stream 143 or from return air stream 143 to outside air stream 141. During summer conditions, heat recovery ventilator 125 may be configured to facilitate a heat transfer between outside air stream 141 and return air stream 143, e.g., heat recovery ventilator 125 may be configured to facilitate a heat transfer by decreasing a temperature of outside air stream 141 and increasing a temperature of return air stream 143. During winter conditions, heat recovery ventilator 125 may be configured to facilitate a heat transfer between outside air stream 141 and return air stream 143, e.g., heat recovery ventilator 125 may be configured to facilitate a heat transfer by increasing a temperature of outside air stream 141 and decreasing a temperature of return air stream 143. In one or more embodiments, heat recovery ventilator 125 may be configured to facilitate a moisture transfer, e.g., heat recovery ventilator 125 may be configured to facilitate a moisture transfer between air streams separated by partition 111. Illustratively, heat recovery ventilator 125 may be configured to facilitate a transfer of moisture from outside air stream 141 to return air stream 143 or from return air stream 143 to outside air stream 141. During summer conditions, heat recovery ventilator 125 may be configured to facilitate a moisture transfer between outside air stream 141 and return air stream 143, e.g., heat recovery ventilator 125 may be configured to facilitate a moisture transfer by decreasing a humidity of outside air stream 141 and increasing a humidity of return air stream 143. During winter conditions, heat recovery ventilator 125 may be configured to facilitate a moisture transfer between outside air stream 141 and return air stream 143, e.g., heat recovery ventilator 125 may be configured to facilitate a moisture transfer by increasing a humidity of outside air stream 141 and decreasing a humidity of return air stream 143.

Illustratively, heat recovery ventilator 125 may be configured to recover sensible energy wherein outside air stream 141 may ingress fourth supply air zone 153 at a first temperature and outside air stream 141 may ingress fifth supply air zone 154 at a second temperature. In one or more embodiments, the second temperature of outside air stream 141 may be less than the first temperature of outside air stream 141, e.g., the second temperature of outside air stream 141 may be less than the first temperature of outside air stream 141 during summer conditions. Illustratively, the second temperature of outside air stream 141 may be less than the first temperature of outside air stream 141 during winter conditions. In one or more embodiments, the second temperature of outside air stream 141 may be greater than the first temperature of outside air stream 141, e.g., the second temperature of outside air stream 141 may be greater than the first temperature of outside air stream 141 during winter conditions. Illustratively, the second temperature of outside air stream 141 may be greater than the first temperature of outside air stream 141 during summer conditions. In one or more embodiments, heat recovery ventilator 125 may be configured to recover sensible energy wherein return air stream 143 may ingress first return air zone 160 at a first temperature and return air stream 143 may ingress second return air zone 161 at a second temperature. Illustratively, the second temperature of return air stream 143 may be less than the first temperature of return air stream 143, e.g., the second temperature of return air stream 143 may be less than the first temperature of return air stream 143 during winter conditions. In one or more embodiments, the second temperature of return air stream 143 may be less than the first temperature of return air stream 143 during summer conditions. Illustratively, the second temperature of return air stream 143 may be greater than the first temperature of return air stream 143, e.g., the second temperature of return air stream 143 may be greater than the first temperature of return air stream 143 during summer conditions. In one or more embodiments, the second temperature of return air stream 143 may be greater than the first temperature of return air stream 143 during winter conditions.

In one or more embodiments, direct expansion coil 110 may be disposed in third air supply zone 152, e.g., direct expansion coil 110 may be disposed in second supply air zone 151 or direct expansion coil 110 may be disposed in fourth supply air zone 153. For example, direct expansion coil 110 may be disposed in second supply air zone 151, third supply air zone 152, and fourth supply air zone 153. Illustratively, second supply air zone 151, third supply air zone 152, and fourth supply air zone 153 may comprise a single supply air zone, e.g., outside air stream 141 may have a same temperature and moisture content in second supply air zone, third supply air zone 152, and fourth supply air zone. In one or more embodiments, partition 111 may be configured to separate direct expansion coil 110 from return air stream 143, e.g., partition 111 may be configured to hermetically separate direct expansion coil 110 from return air stream 143. In one or more embodiments, direct expansion coil 110 may be configured to increase or decrease a temperature of outside air stream 141. Illustratively, outside air stream 141 may ingress second supply air zone 151 at a first temperature and outside air stream 141 may ingress fourth supply air zone 153 at a second temperature. In one or more embodiments, the second temperature of outside air stream 141 may be less than the first temperature of outside air stream 141, e.g., the second temperature of outside air stream 141 may be less than the first temperature of outside air stream 141 during summer conditions. Illustratively, the second temperature of outside air stream 141 may be greater than the first temperature of outside area stream 141, e.g., the second temperature of outside air stream 141 may be greater than the first temperature of outside air stream 141 during summer conditions.

Illustratively, high efficiency ventilation system in a heat pump configuration 100 may comprise an air exhauster 130 and an air supplier 135. In one or more embodiments, air exhauster 130 may comprise a fan or a blower. Illustratively, air exhauster 130 may be configured to facilitate an exhaust of return air stream 143, e.g., air exhauster 130 may be configured to transfer exhaust air stream 144 out from fourth return air zone 163 and into an uncontrolled environment. In one or more embodiments, air supplier 135 may comprise a fan or a blower. Illustratively, air supplier 135 may be configured to facilitate a supply of outside air stream 141, e.g., air supplier 135 may be configured to transfer supply air stream 142 out from sixth supply air zone 155 and into controlled environment 115.

In one or more embodiments, high efficiency ventilation system in a heat pump configuration 100 may be configured to ventilate a controlled environment 115 wherein outside air stream 141 may ingress first supply air zone 150 at a first temperature and having a first moisture content. Illustratively, energy recovery ventilator 120 may be configured to increase a temperature of outside air stream 141 or decrease a temperature of outside air stream 141. In one or more embodiments, energy recovery ventilator 120 may be configured to increase a moisture content of outside air stream 141 or decrease a moisture content of outside air stream 141. Illustratively, high efficiency ventilation system in a heat pump configuration 100 may be configured to ventilate a controlled environment 115 wherein outside air stream 141 may ingress second supply air zone 151 at a second temperature and having a second moisture content. In one or more embodiments, the second temperature of outside air stream 141 may be greater than the first temperature of outside air stream 141. Illustratively, the second temperature of outside air stream 141 may be less than the first temperature of outside air stream 141. In one or more embodiments, the second temperature of outside air stream 141 may be an unchanged temperature from the first temperature of outside air stream 141. Illustratively, the second moisture content of outside air stream 141 may be greater than the first moisture content of outside air stream 141. In one or more embodiments, the second moisture content of outside air stream 141 may be less than the first moisture content of outside air stream 141. Illustratively, the second moisture content of outside air stream 141 may be an unchanged moisture content from the first moisture content of outside air stream 141. In one or more embodiments, direct expansion coil 110 may be configured to increase a temperature of outside air stream 141 or decrease a temperature of outside air stream 141. Illustratively, high efficiency ventilation system in a heat pump configuration 100 may be configured to ventilate a controlled environment 115 wherein outside air stream 141 may ingress fourth supply air zone 153 at a third temperature. In one or more embodiments, the third temperature of outside air stream 141 may be greater than the second temperature of outside air stream 141. Illustratively, the third temperature of outside air stream 141 may be less than the second temperature of outside air stream 141. In one or more embodiments, the third temperature of outside air stream 141 may be an unchanged temperature from the second temperature of outside air stream 141. Illustratively, heat recovery ventilator 125 may be configured to increase a temperature of outside air stream 141 or decrease a temperature of outside air stream 141. In one or more embodiments, high efficiency ventilation system in a heat pump configuration 100 may be configured to ventilate a controlled environment 115 wherein outside air stream 141 may ingress fifth supply air zone 154 at a fourth temperature. Illustratively, the fourth temperature of outside air stream 141 may be greater than the third temperature of outside air stream 141. In one or more embodiments, the fourth temperature of outside air stream 141 may be less than the third temperature of outside air stream 141. Illustratively, the fourth temperature of outside air stream 141 may be an unchanged temperature from the third temperature of outside air stream 141. In one or more embodiments, air supplier 135 may be configured to supply outside air stream 141 to controlled environment 115 as supply air stream 142. Illustratively, supply air stream 142 may comprise outside air stream 141, e.g., supply air stream 142 may comprise outside air stream 141 at the fourth temperature and having the second moisture content.

In one or more embodiments, high efficiency ventilation system in a heat pump configuration 100 may be configured to ventilate a controlled environment 115 wherein return stream 143 may ingress first return air zone 160 at a first temperature and having a first moisture content. Illustratively, heat recovery ventilator 125 may be configured to increase a temperature of return air stream 143 or decrease a temperature of return air stream 143. In one or more embodiments, high efficiency ventilation system in a heat pump configuration 100 may be configured to ventilate a controlled environment 115 wherein outside return stream 143 may ingress second return air zone 161 at a second temperature. Illustratively, the second temperature of return air stream 143 may be greater than the first temperature of return air stream 143. In one or more embodiments, the second temperature of return air stream 143 may be less than the first temperature of return air stream 143. Illustratively, the second temperature of return air stream 143 may be an unchanged temperature from the first temperature of return air stream 143. In one or more embodiments, energy recovery ventilator 120 may be configured to increase a temperature of return air stream 143 or decrease a temperature of return air stream 143. Illustratively, energy recovery ventilator 120 may be configured to increase a moisture content of return air stream 143 or decrease a moisture content of return air stream 143. In one or more embodiments, high efficiency ventilation system in a heat pump configuration 100 may be configured to ventilate a controlled environment 115 wherein return stream 143 may ingress third return air zone 162 at a third temperature and having a second moisture content. In one or more embodiments, the third temperature of return air stream 143 may be greater than the second temperature of return air stream 143. Illustratively, the third temperature of return air stream 143 may be less than the second temperature of return air stream 143. In one or more embodiments, the third temperature of return air stream 143 may be an unchanged temperature from the second temperature of return air stream 143. Illustratively, the second moisture content of return air stream 143 may be greater than the first moisture content of return air stream 143. In one or more embodiments, the second moisture content of return air stream 143 may be less than the first moisture content of return air stream 143. Illustratively, the second moisture content of return air stream 143 may be an unchanged moisture content from the first moisture content of return air stream 143. In one or more embodiments, air exhauster 130 may be configured to exhaust return air stream 143 to an uncontrolled environment as exhaust air stream 144. Illustratively, exhaust air stream 144 may comprise return air stream 143, e.g., exhaust air stream 144 may comprise return air stream at the third temperature and having the second moisture content.

Figure 2:
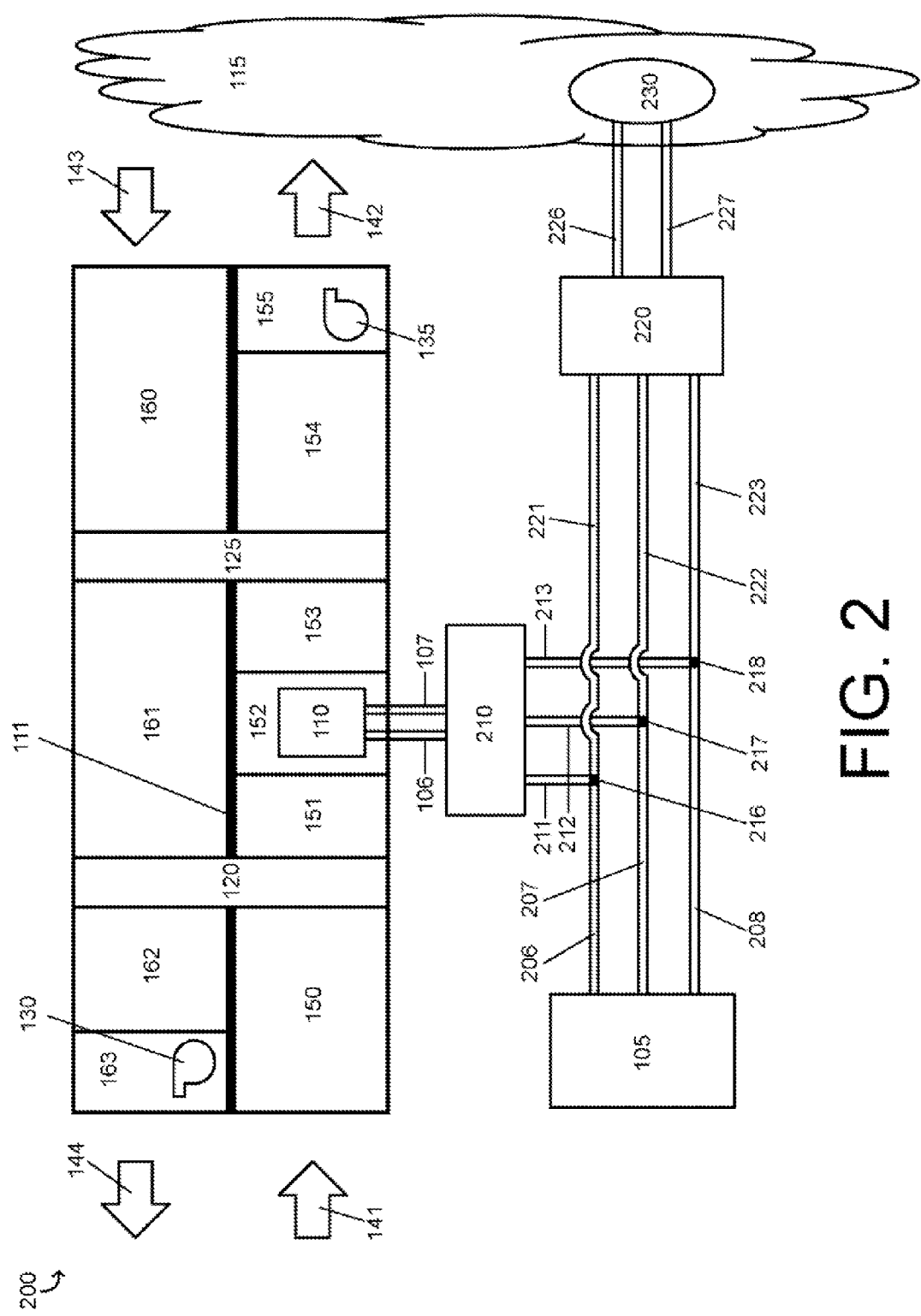
FIG. 2 is a schematic diagram illustrating a high efficiency ventilation system in a heat recovery configuration.

FIG. 2 is a schematic diagram illustrating a high efficiency ventilation system in a heat recovery configuration 200. In one or more embodiments, high efficiency ventilation system in a heat recovery configuration 200 may comprise a first branch selector unit 210, a second branch selector unit 220, and a fan coil unit 230. Illustratively, first branch selector unit 210 may be disposed between refrigerant flow controlling condensing unit 105 and direct expansion coil 110. In one or more embodiments, first branch selector unit 210 may be directly or indirectly connected to direct expansion coil 110 by liquid line 106 and gas and suction line 107. Illustratively, refrigerant flow controlling condensing unit 105 may be configured to facilitate a transfer of a refrigerant from refrigerant flow controlling condensing unit 105 to first branch selector unit 210. In one or more embodiments, refrigerant flow controlling condensing unit 105 may be configured to facilitate a transfer of a refrigerant from first branch selector unit 210 to refrigerant flow controlling condensing unit 105. Illustratively, first branch selector unit 210 may be directly or indirectly connected to refrigerant flow controlling condensing unit 105 by a gas and suction line 206, a suction line 207, and a liquid line 208. In one or more embodiments, first branch selector unit 210 may be connected to gas and suction line 206 at a gas and suction line junction 216, e.g., first branch selector unit 210 may be connected to gas and suction line junction 216 by a first branch selector unit gas and suction line 211. For example, gas and suction line junction 216 may comprise a Refnet joint. Illustratively, first branch selector unit 210 may be connected to suction line 207 at a suction line junction 217, e.g., first branch selector unit 210 may be connected to suction line junction 217 by a first branch selector unit suction line 212. For example, suction line junction 217 may comprise a Refnet joint. In one or more embodiments, first branch selector unit 210 may be connected to liquid line 208 at a liquid line junction 218, e.g., first branch selector unit 210 may be connected to liquid line junction 218 by a first branch selector unit liquid line 213. For example, liquid line junction 218 may comprise a Refnet joint. Illustratively, first branch selector unit 210 may be configured to facilitate a transfer of a refrigerant from first branch selector unit 210 to direct expansion coil 110. In one or more embodiments, first branch selector unit 210 may be configured to facilitate a transfer of a refrigerant from direct expansion coil 110 to first branch selector unit 210. Illustratively, first branch selector unit 210 may be configured to facilitate a transfer of a refrigerant from refrigerant flow controlling condensing unit 105 to direct expansion coil 110. In one or more embodiments, first branch selector unit 210 may be configured to facilitate a transfer of a refrigerant from direct expansion coil 110 to refrigerant flow controlling condensing unit 105.

Illustratively, second branch selector unit 220 may be disposed between refrigerant flow controlling condensing unit 105 and fan coil unit 230. In one or more embodiments, second branch selector unit 220 may be directly or indirectly connected to fan coil unit 230 by fan coil liquid line 226 and fan coil gas and suction line 227. Illustratively, refrigerant flow controlling condensing unit 105 may be configured to facilitate a transfer of a refrigerant from refrigerant flow controlling condensing unit 105 to second branch selector unit 220. In one or more embodiments, refrigerant flow controlling condensing unit 105 may be configured to facilitate a transfer of a refrigerant from second branch selector unit 220 to refrigerant flow controlling condensing unit 105. Illustratively, second branch selector unit 220 may be directly or indirectly connected to refrigerant flow controlling condensing unit 105 by gas and suction line 206, suction line 207, and liquid line 208. In one or more embodiments, second branch selector unit 220 may be connected to gas and suction line 206 at gas and suction line junction 216, e.g., second branch selector unit 220 may be connected to gas and suction line junction 216 by a second branch selector unit gas and suction line 221. Illustratively, second branch selector unit 220 may be connected to suction line 207 at suction line junction 217, e.g., second branch selector unit 220 may be connected to suction line junction 217 by a second branch selector unit suction line 222. In one or more embodiments, second branch selector unit 220 may be connected to liquid line 208 at liquid line junction 218, e.g., second branch selector unit 220 may be connected to liquid line junction 218 by a second branch selector unit liquid line 223. Illustratively, second branch selector unit 220 may be configured to facilitate a transfer of a refrigerant from second branch selector unit 220 to fan coil unit 230. In one or more embodiments, second branch selector unit 220 may be configured to facilitate a transfer of a refrigerant from fan coil unit 230 to second branch selector unit 220. Illustratively, second branch selector unit 220 may be configured to facilitate a transfer of a refrigerant from refrigerant flow controlling condensing unit 105 to fan coil unit 230. In one or more embodiments, second branch selector unit 220 may be configured to facilitate a transfer of a refrigerant from fan coil unit 230 to refrigerant flow controlling condensing unit 105.

Illustratively, first branch selector unit 210 and second branch selector unit 220 may comprise a single branch selector unit, e.g., first branch selector unit 210 and second branch selector unit 220 may comprise a multi-port branch selector. In one or more embodiments, first branch selector unit 210 and second branch selector unit 220 may comprise independent multi-port branch selectors, e.g., first branch selector unit 210 may comprise a first multi-port branch selector and second branch selector unit 220 may comprise a second multi-port branch selector. Illustratively, first branch selector unit 210 and second branch selector unit 220 may comprise a single branch circuit controller. In one or more embodiments, first branch selector unit 210 and second branch selector unit 220 may comprise independent branch circuit controllers, e.g., first branch selector unit 210 may comprise a first branch circuit controller and second branch selector unit 220 may comprise a second branch circuit controller. Illustratively, first branch selector unit 210 and second branch selector unit 220 may comprise a single branch selector box. In one or more embodiments, first branch selector unit 210 and second branch selector unit 220 may comprise independent branch selector boxes, e.g., first branch selector unit 210 may comprise a first branch selector box and second branch selector unit 220 may comprise a second branch selector box.

Illustratively, high efficiency ventilation system in a heat recovery configuration 200 may be configured to ventilate controlled environment 115 by supplying air at a controlled temperature and humidity via supply air stream 142. In one or more embodiments, high efficiency ventilation system in a heat recovery configuration 200 may be configured to ventilate controlled environment 115 by exhausting air via exhaust air stream 144. Illustratively, high efficiency ventilation system in a heat recovery configuration 200 may be configured to control a temperature of controlled environment 115, e.g., fan coil unit 230 may be configured to increase or decrease a temperature of controlled environment 115. During summer conditions, fan coil unit 230 may be configured to decrease a temperature of controlled environment 115. During winter conditions, fan coil unit 230 may be configured to increase a temperature of controlled environment 115. In one or more embodiments, direct expansion coil 110 may be configured to increase a temperature of outside air stream 141 and fan coil unit 230 may be configured to simultaneously increase a temperature of controlled environment 115. Illustratively, direct expansion coil 110 may be configured to increase a temperature of outside air stream 141 and fan coil unit 230 may be configured to simultaneously decrease a temperature of controlled environment 115. In one or more embodiments, direct expansion coil 110 may be configured to decrease a temperature of outside air stream 141 and fan coil unit 230 may be configured to simultaneously decrease a temperature of controlled environment 115. Illustratively, direct expansion coil 110 may be configured to decrease a temperature of outside air stream 141 and fan coil unit 230 may be configured to simultaneously increase a temperature of controlled environment 115.

In one or more embodiments, refrigerant flow controlling condensing unit 105 may be directly or indirectly connected to a plurality of fan coil units 230, e.g., refrigerant flow controlling condensing unit 105 may be connected to a plurality of second branch selector units 220 wherein each second branch selector unit 220 of the plurality of second branch selector units 220 may be connected to a fan coil unit 230. Illustratively, refrigerant flow controlling condensing unit 105 may be directly or indirectly connected to a plurality of fan coil units 230 wherein each fan coil unit 230 of the plurality of fan coil units 230 may be configured to increase or decrease a temperature of controlled environment 115. For example, a first fan coil unit 230 may be disposed in a first zone of controlled environment 115 and a second fan coil unit 230 may be disposed in a second zone of controlled environment 115. In one or more embodiments, the first fan coil unit 230 may be configured to increase or decrease a temperature of the first zone of controlled environment 115. Illustratively, the second fan coil unit 230 may be configured to increase or decrease a temperature of the second zone of controlled environment 115. In one or more embodiments, the first fan coil unit 230 may be configured to increase a temperature of the first zone of controlled environment 115 and the second fan coil unit 230 may be configured to simultaneously increase a temperature of the second zone of controlled environment 115. Illustratively, the first fan coil unit 230 may be configured to increase a temperature of the first zone of controlled environment 115 and the second fan coil unit 230 may be configured to simultaneously decrease a temperature of the second zone of controlled environment 115. In one or more embodiments, the first fan coil unit 230 may be configured to decrease a temperature of the first zone of controlled environment 115 and the second fan coil unit 230 may be configured to simultaneously decrease a temperature of the second zone of controlled environment 115. Illustratively, the first fan coil unit 230 may be configured to decrease a temperature of the first zone of controlled environment 115 and the second fan coil unit 230 may be configured to simultaneously increase a temperature of the second zone of controlled environment 115. In one or more embodiments, high efficiency ventilation system in a heat recovery configuration 200 may be configured to recover energy from a first fan coil unit 230 operating in first mode of operation to improve an operating efficiency of a second fan coil unit 230 operating in a second mode of operation. Illustratively, high efficiency ventilation system in a heat recovery configuration 200 may be configured to increase an operating efficiency in a range of 10.0 to 150.0 percent, e.g., high efficiency ventilation system in a heat recovery configuration 200 may be configured to increase an operating efficiency by 98.0 percent. In one or more embodiments, high efficiency ventilation system in a heat recovery configuration 200 may be configured to increase an operating efficiency by less than 10.0 percent or greater than 150.0 percent.

Illustratively, high efficiency ventilation system in a heat recovery configuration 200 may improve an operating efficiency by increasing an Integrated Energy Efficiency Ratio value in a range of 2.0 to 10.0, e.g., high efficiency ventilation system in a heat recovery configuration 200 may increase an Integrated Energy Efficiency Ratio value by 8.0. In one or more embodiments, high efficiency ventilation system in a heat recovery configuration 200 may improve an operating efficiency by increasing an Integrated Energy Efficiency Ratio value by less than 2.0 or by more than 10.0. Illustratively, high efficiency ventilation system in a heat recovery configuration 200 may improve an operating efficiency by increasing a Coefficient of Performance value in a range of 1.2 to 10.0, e.g., high efficiency ventilation system in a heat recovery configuration 200 may improve an operating efficiency by increasing a Coefficient of Performance value by 8.0. In one or more embodiments, high efficiency ventilation system in a heat recovery configuration 200 may improve an operating efficiency by increasing a Coefficient of Performance by less than 1.2 or by more than 10.0. Illustratively, a first fan coil unit 230 may be operating in a cooling mode, e.g., the first fan coil unit 230 may be configured to decrease a temperature of a first zone of controlled environment 115 by removing heat from the first zone of controlled environment 115. In one or more embodiments, a second fan coil unit 230 may be operating in a heating mode, e.g., the second fan coil unit 230 may be configured to increase a temperature of a second zone of controlled environment 115 by sups plying heat to the second zone of controlled environment 115. Illustratively, high efficiency ventilation system in a heat recovery configuration 200 may be configured to recover energy by transferring heat removed from the first zone of controlled environment 115 to the second zone of controlled environment 115, e.g., high efficiency ventilation system in a heat recovery configuration 200 may be configured to supply heat removed from the first zone of controlled environment 115 to the second zone of controlled environment 115. In one or more embodiments, high efficiency ventilation system in a heat recovery configuration 200 may be configured to recover energy from a first fan coil unit 230 operating in first mode of operation to improve an operating efficiency of a plurality of fan coil units 230 operating in a second mode of operation. Illustratively, a first fan coil unit 230 may be operating in a cooling mode, e.g., the first fan coil unit 230 may be configured to decrease a temperature of a first zone of controlled environment 115 by removing heat from the first zone of controlled environment 115. In one or more embodiments, a plurality of fan coil units 230 may be operating in a heating mode, e.g., a plurality of fan coil units 230 may be configured to increase a temperature of a plurality of zones of controlled environment 115 by supplying heat to the plurality of zones of controlled environment 115. Illustratively, high efficiency ventilation system in a heat recovery configuration 200 may be configured to recover energy by transferring heat removed from the first zone of controlled environment 115 to the plurality of zones of controlled environment 115, e.g., high efficiency ventilation system in a heat recovery configuration 200 may be configured to supply heat removed from the first zone of controlled environment 115 to the plurality of zones of controlled environment 115. In one or more embodiments, high efficiency ventilation system in a heat recovery configuration 200 may be configured to uniformly transfer heat removed from the first zone of controlled environment 115 to the plurality of zones of controlled environment 115, e.g., heat removed from the first zone of controlled environment 115 may be distributed wherein each zone of the plurality of zones of controlled environment 115 receives an equal amount of heat removed from the first zone of controlled environment 115. Illustratively, high efficiency ventilation system in a heat recovery configuration 200 may be configured to selectively transfer heat removed from the first zone of controlled environment 115 to the plurality of zones of controlled environment 115, e.g., heat removed from the first zone of controlled environment 115 may be distributed to the plurality of zones of controlled environment 115 in accordance with one or more distribution variables. In one or more embodiments, distribution variables may comprise information about a particular zone of the plurality of zones of controlled environment 115, e.g., distribution variables may comprise a temperature of the particular zone of the plurality of zones of controlled environment 115. Illustratively, distribution variables may comprise information about a particular fan coil unit 230 of a plurality of fan coil units 230, e.g., distribution variables may comprise a temperature control efficiency of the particular fan coil unit 230 of the plurality of fan coil units 230.

In one or more embodiments, high efficiency ventilation system in a heat recovery configuration 200 may be configured to recover energy from fan coil unit 230 to improve an operating efficiency of direct expansion coil 110. Illustratively, high efficiency ventilation system in a heat recovery configuration 200 may be configured to recover energy from direct expansion coil 110 to improve an operating efficiency of fan coil unit 230. In one or more embodiments, a first fan coil unit 230 may be operating in a cooling mode, e.g., the first fan coil unit 230 may be configured to decrease a temperature of a first zone of controlled environment 115 by removing heat from the first zone of controlled environment 115. Illustratively, direct expansion coil 110 may be operating in a heating mode, e.g., direct expansion coil 110 may be configured to increase a temperature of outside air stream 141 by supplying heat to outside air stream 141. In one or more embodiments, high efficiency ventilation system in a heat recovery configuration 200 may be configured to recover energy by transferring heat removed from the first zone of controlled environment 115 to outside air stream 141, e.g., high efficiency ventilation system in a heat recovery configuration 200 may be configured to supply heat removed from the first zone of controlled environment 115 to outside air stream 141. Illustratively, direct expansion coil 110 may be operating in a cooling mode, e.g., direct expansion coil 110 may be configured to decrease a temperature of outside air stream 141 by removing heat from outside air stream 141. In one or more embodiments, a first fan coil unit 230 may be operating in a heating mode, e.g., the first fan coil unit 230 may be configured to increase a temperature of a first zone of controlled environment 115 by supplying heat to the first zone of controlled environment 115. Illustratively, high efficiency ventilation system in a heat recovery configuration 200 may be configured to recover energy by transferring heat removed from the outside air stream 141 to the first zone of controlled environment 115, e.g., high efficiency ventilation system in a heat recovery configuration 200 may be configured to supply heat removed from outside air stream 141 to the first zone of controlled environment 115.

In one or more embodiments, direct expansion coil 110 may be operating in a cooling mode, e.g., direct expansion coil 110 may be configured to decrease a temperature of outside air stream 141 by removing heat from outside air stream 141. Illustratively, a plurality of fan coil units 230 may be operating in a heating mode, e.g., a plurality of fan coil units 230 may be configured to increase a temperature of a plurality of zones of controlled environment 115 by supplying heat to the plurality of zones of controlled environment 115. In one or more embodiments, high efficiency ventilation system in a heat recovery configuration 200 may be configured to recover energy by transferring heat removed from outside air stream 141 to the plurality of zones of controlled environment 115, e.g., high efficiency ventilation system in a heat recovery configuration 200 may be configured to supply heat removed from outside air stream 141 to the plurality of zones of controlled environment 115. Illustratively, high efficiency ventilation system in a heat recovery configuration 200 may be configured to uniformly transfer heat removed from outside air stream 141 to the plurality of zones of controlled environment 115, e.g., heat removed from outside air stream 141 may be distributed wherein each zone of the plurality of zones of controlled environment 115 receives an equal amount of heat removed from outside air stream 141. In one or more embodiments, high efficiency ventilation system in a heat recovery configuration 200 may be configured to selectively transfer heat removed from outside air stream 141 to the plurality of zones of controlled environment 115, e.g., heat removed from outside air stream 141 may be distributed to the plurality of zones of controlled environment 115 in accordance with one or more distribution variables. Illustratively, distribution variables may comprise information about a particular zone of the plurality of zones of controlled environment 115, e.g., distribution variables may comprise a temperature of the particular zone of the plurality of zones of controlled environment 115. In one or more embodiments, distribution variables may comprise information about a particular fan coil unit 230 of a plurality of fan coil units 230, e.g., distribution variables may comprise a temperature control efficiency of the particular fan coil unit 230 of the plurality of fan coil units 230.

Figure 3:
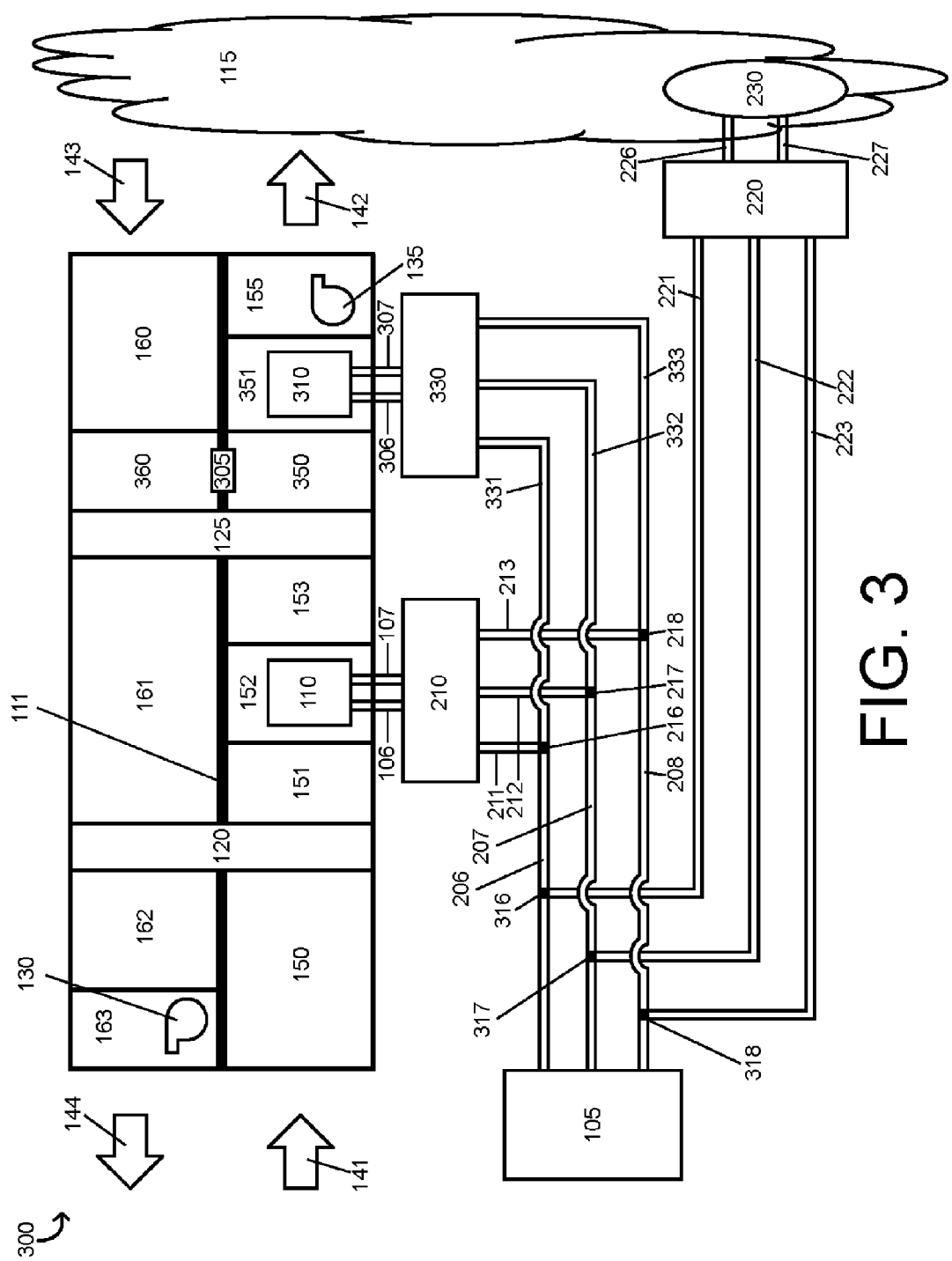
FIG. 3 is a schematic diagram illustrating a high efficiency ventilation system with an auxiliary coil in outside air stream.

FIG. 3 is a schematic diagram illustrating a high efficiency ventilation system with an auxiliary coil in outside air stream 300. Illustratively, high efficiency ventilation system with an auxiliary coil in outside air stream 300 may comprise a refrigerant flow controlling condensing unit 105, a first branch selector unit 210, a second branch selector unit 220, a third branch selector unit 330, a direct expansion coil 110, a fan coil unit 230, a bypass mechanism 305, and an auxiliary direct expansion coil 310. In one or more embodiments, first branch selector unit 210 may be disposed between direct expansion coil 110 and refrigerant flow controlling condensing unit 105. Illustratively, first branch selector unit 210 may be directly or indirectly connected to direct expansion coil 110 by liquid line 106 and gas and suction line 107. In one or more embodiments, refrigerant flow controlling condensing unit 105 may be configured to facilitate a transfer of a refrigerant from refrigerant flow controlling condensing unit 105 to first branch selector unit 210. Illustratively, refrigerant flow controlling condensing unit 105 may be configured to facilitate a transfer of a refrigerant from first branch selector unit 210 to refrigerant flow controlling condensing unit 105. In one or more embodiments, first branch selector unit 210 may be directly or indirectly connected to refrigerant flow controlling condensing unit 105 by a gas and suction line 206, a suction line 207, and a liquid line 208. Illustratively, first branch selector unit 210 may be connected to gas and suction line 206 at a gas and suction line junction 216, e.g., first branch selector unit 210 may be connected to gas and suction line junction 216 by a first branch selector unit gas and suction line 211. In one or more embodiments, first branch selector unit 210 may be connected to suction line 207 at a suction line junction 217, e.g., first branch selector unit 210 may be connected to suction line junction 217 by a first branch selector unit suction line 212. Illustratively, first branch selector unit 210 may be connected to liquid line 208 at a liquid line junction 218, e.g., first branch selector unit 210 may be connected to liquid line junction 218 by a first branch selector unit liquid line 213. In one or more embodiments, first branch selector unit 210 may be configured to facilitate a transfer of a refrigerant from first branch selector unit 210 to direct expansion coil 110. Illustratively, first branch selector unit 210 may be configured to facilitate a transfer of a refrigerant from direct expansion coil 110 to first branch selector unit 210. In one or more embodiments, first branch selector unit 210 may be configured to facilitate a transfer of a refrigerant from refrigerant flow controlling condensing unit 105 to direct expansion coil 110. Illustratively, first branch selector unit 210 may be configured to facilitate a transfer of a refrigerant from direct expansion coil 110 to refrigerant flow controlling condensing unit 105.

In one or more embodiments, second branch selector unit 220 may be disposed between refrigerant flow controlling condensing unit 105 and fan coil unit 230. Illustratively, second branch selector unit 220 may be directly or indirectly connected to fan coil unit 230 by fan coil liquid line 226 and fan coil gas and suction line 227. In one or more embodiments, refrigerant flow controlling condensing unit 105 may be configured to facilitate a transfer of a refrigerant from refrigerant flow controlling condensing unit 105 to second branch selector unit 220. Illustratively, refrigerant flow controlling condensing unit 105 may be configured to facilitate a transfer of a refrigerant from second branch selector unit 220 to refrigerant flow controlling condensing unit 105. In one or more embodiments, second branch selector unit 220 may be directly or indirectly connected to refrigerant flow controlling condensing unit 105 by gas and suction line 206, suction line 207, and liquid line 208. Illustratively, second branch selector unit 220 may be connected to gas and suction line 206 at gas and suction line junction 316, e.g., second branch selector unit 220 may be connected to gas and suction line junction 316 by a second branch selector unit gas and suction line 221. For example, gas and suction line junction 316 may comprise a Refnet joint. In one or more embodiments, second branch selector unit 220 may be connected to suction line 207 at suction line junction 317, e.g., second branch selector unit 220 may be connected to suction line junction 317 by a second branch selector unit suction line 222. For example, suction line junction 317 may comprise a Refnet joint. Illustratively, second branch selector unit 220 may be connected to liquid line 208 at liquid line junction 318, e.g., second branch selector unit 220 may be connected to liquid line junction 318 by a second branch selector unit liquid line 223. For example, liquid line junction 318 may comprise a Refnet joint. In one or more embodiments, second branch selector unit 220 may be configured to facilitate a transfer of a refrigerant from second branch selector unit 220 to fan coil unit 230. Illustratively, second branch selector unit 220 may be configured to facilitate a transfer of a refrigerant from fan coil unit 230 to second branch selector unit 220. In one or more embodiments, second branch selector unit 220 may be configured to facilitate a transfer of a refrigerant from refrigerant flow controlling condensing unit 105 to fan coil unit 230. Illustratively, second branch selector unit 220 may be configured to facilitate a transfer of a refrigerant from fan coil unit 230 to refrigerant flow controlling condensing unit 105.

In one or more embodiments, third branch selector unit 330 may be disposed between auxiliary direct expansion coil 310 and refrigerant flow controlling condensing unit 105. Illustratively, third branch selector unit 330 may be directly or indirectly connected to auxiliary direct expansion coil 310 by liquid line 306 and gas and suction line 307. In one or more embodiments, refrigerant flow controlling condensing unit 105 may be configured to facilitate a transfer of a refrigerant from refrigerant flow controlling condensing unit 105 to third branch selector unit 330. Illustratively, refrigerant flow controlling condensing unit 105 may be configured to facilitate a transfer of a refrigerant from third branch selector unit 330 to refrigerant flow controlling condensing unit 105. In one or more embodiments, third branch selector unit 330 may be directly or indirectly connected to refrigerant flow controlling condensing unit 105 by a gas and suction line 206, a suction line 207, and a liquid line 208.

Illustratively, third branch selector unit 330 may be connected to gas and suction line 206 at a gas line junction, e.g., third branch selector unit 330 may be connected to a gas line junction by a third branch selector unit gas and suction line 331. In one or more embodiments, third branch selector unit 330 may be connected to suction line 207 at a suction line junction, e.g., third branch selector unit 330 may be connected to a suction line junction by a third branch selector unit suction line 332. Illustratively, third branch selector unit 330 may be connected to liquid line 208 at a liquid line junction, e.g., third branch selector unit 330 may be connected to a liquid line junction 330 by a third branch selector unit liquid line 333. In one or more embodiments, third branch selector unit 330 may be configured to facilitate a transfer of a refrigerant from third branch selector unit 330 to auxiliary direct expansion coil 310. Illustratively, third branch selector unit 330 may be configured to facilitate a transfer of a refrigerant from auxiliary direct expansion coil 310 to third branch selector unit 330. In one or more embodiments, third branch selector unit 330 may be configured to facilitate a transfer of a refrigerant from refrigerant flow controlling condensing unit 105 to auxiliary direct expansion coil 310. Illustratively, third branch selector unit 330 may be configured to facilitate a transfer of a refrigerant from auxiliary direct expansion coil 310 to refrigerant flow controlling condensing unit 105.

Illustratively, first branch selector unit 210, second branch selector unit 220, and third branch selector unit 330 may comprise a single branch selector unit, e.g., first branch selector unit 210, second branch selector unit 220, and third branch selector unit 330 may comprise a multi-port branch selector. In one or more embodiments, first branch selector unit 210, second branch selector unit 220, and third branch selector unit 330 may comprise independent multi-port branch selectors, e.g., first branch selector unit 210 may comprise a first multi-port branch selector, second branch selector unit 220 may comprise a second multi-port branch selector, and third branch selector unit 330 may comprise a third multi-port branch selector. Illustratively, first branch selector unit 210, second branch selector unit 220, and third branch selector unit 330 may comprise a single branch circuit controller. In one or more embodiments, first branch selector unit 210, second branch selector unit 220, and third branch selector unit 330 may comprise independent branch circuit controllers, e.g., first branch selector unit 210 may comprise a first branch circuit controller, second branch selector unit 220 may comprise a second branch circuit controller, and third branch selector unit 330 may comprise a third branch circuit controller. Illustratively, first branch selector unit 210, second branch selector unit 220, and third branch selector unit 330 may comprise a single branch selector box. In one or more embodiments, first branch selector unit 210, second branch selector unit 220, and third branch selector unit 330 may comprise independent branch selector boxes, e.g., first branch selector unit 210 may comprise a first branch selector box, second branch selector unit 220 may comprise a second branch selector box, and third branch selector unit 330 may comprise a third branch selector box.

Illustratively, high efficiency ventilation system with an auxiliary coil in outside air stream 300 may be configured to ventilate controlled environment 115 by supplying air at a controlled temperature and humidity via supply air stream 142. In one or more embodiments, high efficiency ventilation system with an auxiliary coil in outside air stream 300 may be configured to ventilate controlled environment 115 by exhausting air via exhaust air stream 144. Illustratively, high efficiency ventilation system with an auxiliary coil in outside air stream 300 may be configured to control a temperature of controlled environment 115, e.g., fan coil unit 230 may be configured to increase or decrease a temperature of controlled environment 115. During summer conditions, fan coil unit 230 may be configured to decrease a temperature of controlled environment 115. During winter conditions, fan coil unit 230 may be configured to increase a temperature of controlled environment 115. In one or more embodiments, direct expansion coil 110 and auxiliary direct expansion coil 310 may be configured to increase a temperature of outside air stream 141 and fan coil unit 230 may be configured to simultaneously increase a temperature of controlled environment 115. Illustratively, direct expansion coil 110 and auxiliary direct expansion coil 310 may be configured to increase a temperature of outside air stream 141 and fan coil unit 230 may be configured to simultaneously decrease a temperature of controlled environment 115. In one or more embodiments, direct expansion coil 110 may be configured to increase a temperature of outside air stream 141 and fan coil unit 230 may be configured to simultaneously decrease a temperature of controlled environment 115. Illustratively, direct expansion coil 110 may be configured to decrease a temperature of outside air stream 141 and fan coil unit 230 may be configured to simultaneously increase a temperature of controlled environment 115. In one or more embodiments, high efficiency ventilation system with an auxiliary coil in outside air stream 300 may comprise a high efficiency ventilation system in a heat recovery configuration 200. Illustratively, high efficiency ventilation system with an auxiliary coil in outside air stream 300 may be configured to recover energy from a first fan coil unit 230 operating in a first mode of operation to improve an operating efficiency of a second fan coil unit 230 operating in a second mode of operation. In one or more embodiments, high efficiency ventilation system with an auxiliary coil in outside air stream 300 may be configured to recover energy from one or more fan coil units 230 to improve an operating efficiency of direct expansion coil 110 or auxiliary direct expansion coil 310. Illustratively, high efficiency ventilation system with an auxiliary coil in outside air stream 300 may be configured to recover energy from direct expansion coil 110 or auxiliary direct expansion coil 310 to improve an operating efficiency of one or more fan coil units 230.

In one or more embodiments, auxiliary direct expansion coil 310 may be disposed within an eighth supply air zone 351, e.g., auxiliary direct expansion coil 310 may be configured to increase or decrease a temperature of air in eighth supply air zone 351. Illustratively, auxiliary direct expansion coil 310 may be configured to increase or decrease a temperature of outside air stream 141. In one or more embodiments, auxiliary direct expansion coil 310 may comprise a heating-only direct expansion coil 110, e.g., auxiliary direct expansion coil 310 may be configured to increase a temperature of outside air stream 141. Illustratively, auxiliary direct expansion coil 310 may be configured to increase a temperature of outside air stream 141 during a performance of a maintenance operation on refrigerant flow controlling condensing unit 105. In one or more embodiments, a performance of a maintenance operation on refrigerant flow controlling condensing unit 105 may temporarily reduce a heating capacity of direct expansion coil 110, e.g., a performance of a maintenance operation on refrigerant flow controlling condensing unit 105 may temporarily reduce a heating capacity of direct expansion coil 110 by 50.0 percent. Illustratively, auxiliary direct expansion coil 310 may be configured to provide heating capacity to supplement a reduced heating capacity of direct expansion coil 110, e.g., auxiliary direct expansion coil 310 may be configured to provide heating capacity to supplement a reduced heating capacity of direct expansion coil 110 during a performance of a maintenance operation on refrigerant flow controlling condensing unit 105. In one or more embodiments, direct expansion coil 110 may be configured to increase a temperature of outside air stream 141, e.g., outside air stream 141 may ingress second supply air zone 151 at a first temperature. Illustratively, direct expansion coil 110 may be configured to increase a temperature of air in third supply air zone 152, e.g., outside air stream 141 may ingress fourth supply air zone 153 at a second temperature. In one or more embodiments, the second temperature of outside air stream 141 may be greater than the first temperature of outside air stream 141. Illustratively, heat recovery ventilator 125 may be configured to increase a temperature of outside air stream 141, e.g., outside air stream 141 may ingress seventh supply air zone 350 at a third temperature wherein the third temperature of outside air stream 141 is greater than the second temperature of outside air stream 141. In one or more embodiments, auxiliary direct expansion coil 310 may be configured to increase a temperature of outside air stream 141, e.g., outs side air stream 141 may ingress sixth supply air zone 155 at a fourth temperature wherein the fourth temperature of outside air stream 141 is greater than the third temperature of outside air stream 141. Illustratively, heat recovery ventilator 125 may be in a standby mode, e.g., heat recovery ventilator 125 may be configured not to increase or decrease a temperature of outside air stream 141. In one or more embodiments, direct expansion coil 110 may be configured to increase a temperature of outside air stream 141, e.g., outside air stream 141 may ingress second supply air zone 151 at a first temperature and outside air stream 141 may ingress fourth supply air zone 153 at a second temperature wherein the second temperature of outside air stream 141 may be greater than the first temperature of outside air stream 141. Illustratively, outside air stream 141 may ingress seventh supply air zone 350 at the second temperature, e.g., outside air stream 141 may ingress seventh supply air zone 350 at the second temperature when heat recovery ventilator 125 is in a standby mode.

In one or more embodiments, auxiliary direct expansion coil 310 may be configured to increase a temperature of outside air stream 141, e.g., outside air stream 141 may ingress sixth supply air zone 155 at a third temperature wherein the third temperature of outside air stream 141 is greater than the second temperature of outside air stream 141. Illustratively, auxiliary direct expansion coil 310 may be configured to provide heating capacity during a defrost operation, e.g., auxiliary direct expansion coil 310 may be configured to provide heating capacity during a defrost operation to defrost direct expansion coil 110. In one or more embodiments, auxiliary direct expansion coil 310 may be configured to provide heating capacity during a defrost operation to defrost energy recovery ventilator 120. Illustratively, auxiliary direct expansion coil 310 may be configured to increase a temperature of outside air stream 141 during a defrost operation to defrost direct expansion coil 110. In one or more embodiments, auxiliary direct expansion coil 310 may be configured to increase a temperature of outside air stream 141 during a defrost operation to defrost energy recovery ventilator 120. Illustratively, auxiliary direct expansion coil 310 may be configured to increase a temperature of return air stream 143, e.g., auxiliary direct expansion coil 310 may be configured to increase a temperature of return air stream 143 during a defrost operation. In one or more embodiments, bypass mechanism 305 may be configured to mechanically control air flow within high efficiency ventilation system with an auxiliary coil in outside air stream 300. Illustratively, bypass mechanism 305 may be configured to direct air flow out from one or more supply air zones and into one or more return air zones. In one or more embodiments, bypass mechanism 305 may be configured to direct air flow out from one or more return air zones and into one or more supply air zones. Illustratively, bypass mechanism 305 may be configured to direct return air stream 143 out from a fifth return air zone 360 and into seventh supply air zone 350, e.g., bypass mechanism 305 may be configured to prevent an ingress of return air stream 143 into second return air zone 161. In one or more embodiments, bypass mechanism 305 may be configured to facilitate an ingress of return air stream 143 into seventh supply air zone 350. Illustratively, bypass mechanism 305 may be configured to facilitate an ingress of return air stream 143 into fourth supply air zone 153, e.g., bypass mechanism 305 may be configured to facilitate an ingress of return air stream 143 into fourth supply air zone 153 during a defrost operation to defrost direct expansion coil 110. In one or more embodiments, bypass mechanism 305 may be configured to facilitate an ingress of return air stream 143 into third supply air zone 152, e.g., bypass mechanism 305 may be configured to facilitate an ingress of return air stream 143 into third supply air zone 152 during a defrost operation to defrost direct expansion coil 110. Illustratively, air supplier 135 may be configured to facilitate an ingress of return air stream 143 into third supply air zone 152 during a defrost operation to defrost direct expansion coil 110, e.g., air supplier 135 may be temporarily reversed to facilitate an ingress of return air stream 143 into third supply air zone 152.

In one or more embodiments, auxiliary direct expansion coil 310 may be configured to increase a temperature of return air stream 143 during a defrost operation to defrost direct expansion coil 110, e.g., auxiliary direct expansion coil 310 may be configured to increase a temperature of seventh supply air zone 350. Illustratively, return air stream 143 may ingress fifth return air zone 360 at a first temperature, e.g., the first temperature may be greater than a temperature of air within third supply air zone 152. In one or more embodiments, bypass mechanism 305 may be configured to direct return air stream 143 out from fifth return air zone 360 and into seventh supply air zone 350. Illustratively, return air stream 143 may ingress seventh supply air zone 350 at the first temperature. In one or more embodiments, auxiliary direct expansion coil 310 may be cons figured to increase a temperature of return air stream 143 in seventh supply air zone 350. Illustratively, return air stream 143 may egress seventh supply air zone 350 at a second temperature wherein the second temperature of return air stream 143 is greater than the first temperature of return air stream 143. In one or more embodiments, return air stream 143 may ingress fourth supply air zone 153 at the second temperature, e.g., return air stream 143 may ingress fourth supply air zone 153 at the second temperature during a defrost operation to defrost direct expansion coil 110.

In one or more embodiments, auxiliary direct expansion coil 310 may be configured to increase a temperature of return air stream 143 during a defrost operation to defrost energy recovery ventilator 120, e.g., auxiliary direct expansion coil 310 may be configured to increase a temperature of seventh supply air zone 350. Illustratively, return air stream 143 may ingress fifth return air zone 360 at a first temperature, e.g., the first temperature may be greater than a temperature of outside air stream 141. In one or more embodiments, bypass mechanism 305 may be configured to direct return air stream 143 out from fifth return air zone 360 and into seventh supply air zone 350. Illustratively, return air stream 143 may ingress seventh supply air zone 350 at the first temperature. In one or more embodiments, auxiliary direct expansion coil 310 may be configured to increase a temperature of return air stream 143 in seventh supply air zone 350. Illustratively, return air stream 143 may egress seventh supply air zone 350 at a second temperature wherein the second temperature of return air stream 143 is greater than the first temperature of return air stream 143. In one or more embodiments, return air stream 143 may ingress fourth supply air zone 153 at the second temperature. Illustratively, direct expansion coil 110 may be configured to increase a temperature of return air stream 143. In one or more embodiments, return air stream 143 may ingress second supply air zone 151 at a third temperature wherein the third temperature of return air stream 143 is greater than the second temperature of return air stream 143. Illustratively, return air stream 143 may ingress second supply air zone 151 at the third temperature during a defrost operation to defrost energy recovery ventilator 120.

Illustratively, bypass mechanism 305 may be configured to direct outside air stream 141 out from seventh supply air zone 350 and into fifth return air zone 360, e.g., bypass mechanism 305 may be configured to facilitate an ingress of outside air stream 141 into fifth return air zone 360 during a defrost operation to defrost energy recovery ventilator 120. In one or more embodiments, outside air stream 141 may ingress seventh supply air zone 350 at a first temperature. Illustratively, auxiliary direct expansion coil 310 may be configured to increase a temperature of outside air stream 141. In one or more embodiments, outside air stream 141 may egress seventh supply air zone 350 at a second temperature wherein the second temperature of outside air stream 141 is greater than the first temperature of outside air stream 141. Illustratively, outside air stream 141 may ingress fifth return air zone 360 at the second temperature. In one or more embodiments, outside air stream 141 may ingress second return air zone 161 at the second temperature during a defrost operation to defrost energy recovery ventilator 120. Illustratively, high efficiency ventilation system with an auxiliary coil in outside air stream 300 may be configured to simultaneously defrost energy recovery ventilator on both sides of partition 111, e.g., direct expansion coil 110 may be configured to defrost energy recovery ventilator 120 in second supply air zone 151 and auxiliary direct expansion coil 310 may be configured to defrost energy recovery ventilator 120 in second return air zone 161.

In one or more embodiments, high efficiency ventilation system with an auxiliary coil in outside air stream 300 may be configured to decrease a temperature of outside air stream 141 to improve cooling efficiency. Illustratively, high efficiency ventilation system with an auxiliary coil in outside air stream 300 may be configured to decrease a temperature of return air stream 143 to improve cooling efficiency. In one or more embodiments, outside air stream 141 may ingress second supply air zone 151 at a first temperature. Illustratively, direct expansion coil 110 may be configured to decrease a temperature of outside air stream 141, e.g., outside air stream 141 may ingress fourth supply air zone 153 at a second temperature wherein the second temperature of outside air stream 141 is less than the first temperature of outside air stream 141. In one or more embodiments, outside air stream 141 may ingress seventh supply air zone 350 at the second temperature. Illustratively, auxiliary direct expansion coil 310 may be configured to decrease a temperature of outside air stream 141, e.g., outside air stream 141 my ingress sixth supply air zone 155 at a third temperature wherein the third temperature of outside air stream 141 is less than the second temperature of outside air stream 141.

In one or more embodiments, auxiliary direct expansion coil 310 may be configured to decrease a temperature of return air stream 143 to decrease a temperature of outside air stream 141 in second supply air zone 151. Illustratively, energy recovery ventilator 120 may be configured to improve cooling efficiency of high efficiency ventilation system with an auxiliary coil in outside air stream 300 by removing heat from outside air stream 141. In one or more embodiments, energy recovery ventilator 120 may be configured to transfer heat from outside air stream 141 to return air stream 143. Illustratively, auxiliary direct expansion coil 310 may be configured to decrease a temperature of return air stream 143 to increase an amount of heat that energy recovery ventilator 120 is configured to remove from outside air stream 141. In one or more embodiments, return air stream 143 may ingress first return air zone 160 at a first temperature wherein the first temperature is lower than a temperature of outside air stream 141. Illustratively, auxiliary direct expansion coil 310 may be configured to decrease a temperature of return air stream 143, e.g., bypass mechanism 305 may be configured to facilitate a decrease in a temperature of fifth return air zone 360. In one or more embodiments, auxiliary direct expansion coil 310 may be configured to decrease a temperature of return air stream 143, e.g., return air stream 143 may ingress second return air zone 161 at a second temperature wherein the second temperature of return air stream 143 is less than the first temperature of return air stream 143. Illustratively, energy recovery ventilator 120 may be configured to transfer more heat from outside air stream 141 to a return air stream 143 at the second temperature than a return air stream 143 at the first temperature. In one or more embodiments, outside air stream 141 may ingress second supply air zone 151 at a lower temperature if return air stream 143 ingresses second return air zone 161 at the second temperature than if return air stream 143 ingresses second return air zone 161 at the first temperature.

In one or more embodiments, auxiliary direct expansion coil 310 may be disposed in first supply air zone 150, e.g., auxiliary direct expansion coil 310 may be configured to increase or decrease a temperature of air in first supply air zone 150. Illustratively, outside air stream 141 may ingress first supply air zone 150 at a first temperature and outside air stream 141 may egress first supply air zone 150 at a second temperature, e.g., outside air stream 141 may ingress second supply air zone 151 at the second temperature. In one or more embodiments, the second temperature of outside air stream 141 may be greater than the first temperature of outside air stream 141, e.g., auxiliary direct expansion coil 310 may be configured to operate in a heating mode within first supply air zone 150. Illustratively, the second temperature of outside air stream 141 may be less than the first temperature of outside air stream 141, e.g., auxiliary direct expansion coil 310 may be configured to operate in a cooling mode within first supply air zone 150.

In one or more embodiments, auxiliary direct expansion coil 310 may be disposed in second supply air zone 151, e.g., auxiliary direct expansion coil 310 may be configured to increase or decrease a temperature of air in second supply air zone 151. Illustratively, outside air stream 141 may ingress second supply air zone 151 at a first temperature and outside air stream 141 may egress second supply air zone 151 at a second temperature, e.g., outside air stream 141 may ingress third supply air zone 152 at the second temperature. In one or more embodiments, the second temperature of outside air stream 141 may be greater than the first temperature of outside air stream 141, e.g., auxiliary direct expansion coil 310 may be configured to operate in a heating mode within second supply air zone 151. Illustratively, the second temperature of outside air stream 141 may be less than the first temperature of outside air stream 141, e.g., auxiliary direct expansion coil 310 may be configured to operate in a cooling mode within second supply air zone 151.

In one or more embodiments, auxiliary direct expansion coil 310 may be disposed in fourth supply air zone 153, e.g., auxiliary direct expansion coil 310 may be configured to increase or decrease a temperature of air in fourth supply air zone 153. Illustratively, outside air stream 141 may ingress fourth supply air zone 153 at a first temperature and outside air stream 141 may egress fourth supply air zone 153 at a second temperature, e.g., outside air stream 141 may ingress seventh supply air zone 350 at the second temperature. In one or more embodiments, the second temperature of outside air stream 141 may be greater than the first temperature of outside air stream 141, e.g., auxiliary direct expansion coil 310 may be configured to operate in a heating mode within fourth supply air zone 153. Illustratively, the second temperature of outside air stream 141 may be less than the first temperature of outside air stream 141, e.g., auxiliary direct expansion coil 310 may be configured to operate in a cooling mode within fourth supply air zone 153.

In one or more embodiments, auxiliary direct expansion coil 310 may be disposed in seventh supply air zone 350, e.g., auxiliary direct expansion coil 310 may be configured to increase or decrease a temperature of air in seventh supply air zone 350. Illustratively, outside air stream 141 may ingress seventh supply air zone 350 at a first temperature and outside air stream 141 may egress seventh supply air zone 350 at a second temperature, e.g., outside air stream 141 may ingress eighth supply air zone 351 at the second temperature. In one or more embodiments, the second temperature of outside air stream 141 may be greater than the first temperature of outside air stream 141, e.g., auxiliary direct expansion coil 310 may be configured to operate in a heating mode within seventh supply air zone 350. Illustratively, the second temperature of outside air stream 141 may be less than the first temperature of outside air stream 141, e.g., auxiliary direct expansion coil 310 may be configured to operate in a cooling mode within seventh supply air zone 350.

In one or more embodiments, auxiliary direct expansion coil 310 may be disposed in sixth supply air zone 155, e.g., auxiliary direct expansion coil 310 may be configured to increase or decrease a temperature of air in sixth supply air zone 155. Illustratively, outside air stream 141 may ingress sixth supply air zone 155 at a first temperature and outside air stream 141 may egress sixth supply air zone 155 at a second temperature, e.g., outside air stream 141 may ingress controlled environment 115 at the second temperature as supply air stream 142. In one or more embodiments, the second temperature of outside air stream 141 may be greater than the first temperature of outside air stream 141, e.g., auxiliary direct expansion coil 310 may be configured to operate in a heating mode within sixth supply air zone 155. Illustratively, the second temperature of outside air stream 141 may be less than the first temperature of outside air stream 141, e.g., auxiliary direct expansion coil 310 may be configured to operate in a cooling mode within sixth supply air zone 155.

In one or more embodiments, high efficiency ventilation system with an auxiliary coil in outside air stream 300 may comprise a high efficiency ventilation system in a heat pump configuration 100. Illustratively, direct expansion coil 110 may be directly or indirectly connected to a first refrigerant flow controlling condensing unit 105, e.g., direct expansion coil 110 and a first refrigerant flow controlling condensing unit 105 be configured to operate in a heat pump configuration or a heat recovery configuration. In one or more embodiments, auxiliary direct expansion coil 310 may be directly or indirectly connected to a second refrigerant flow controlling condensing unit 105, e.g., auxiliary direct expansion coil 310 and a second refrigerant flow controlling condensing unit 105 may be configured to operate in a heat pump configuration or a heat recovery configuration. Illustratively, direct expansion coil 110 and a first refrigerant flow controlling condensing unit 105 may be configured to operate in a heat pump configuration and auxiliary direct expansion coil 310 and a second refrigerant flow controlling condensing unit 105 may be configured to simultaneously operate in a heat pump configuration. In one or more embodiments, direct expansion coil 110 and a first refrigerant flow controlling condensing unit 105 may be configured to operate in a heat recovery configuration and auxiliary direct expansion coil 310 and a second refrigerant flow controlling condensing unit 105 may be configured to simultaneously operate in a heat recovery configuration. Illustratively, direct expansion coil 110 and a first refrigerant flow controlling condensing unit 105 may be configured to operate in a heat recovery configuration and auxiliary direct expansion coil 310 and a second refrigerant flow controlling condensing unit 105 may be configured to simultaneously operate in a heat pump configuration. In one or more embodiments, direct expansion coil 110 and a first refrigerant flow controlling condensing unit 105 may be configured to operate in a heat pump configuration and auxiliary direct expansion coil 310 and a second refrigerant flow controlling condensing unit 105 may be configured to simultaneously operate in a heat recovery configuration.

Figure 4:
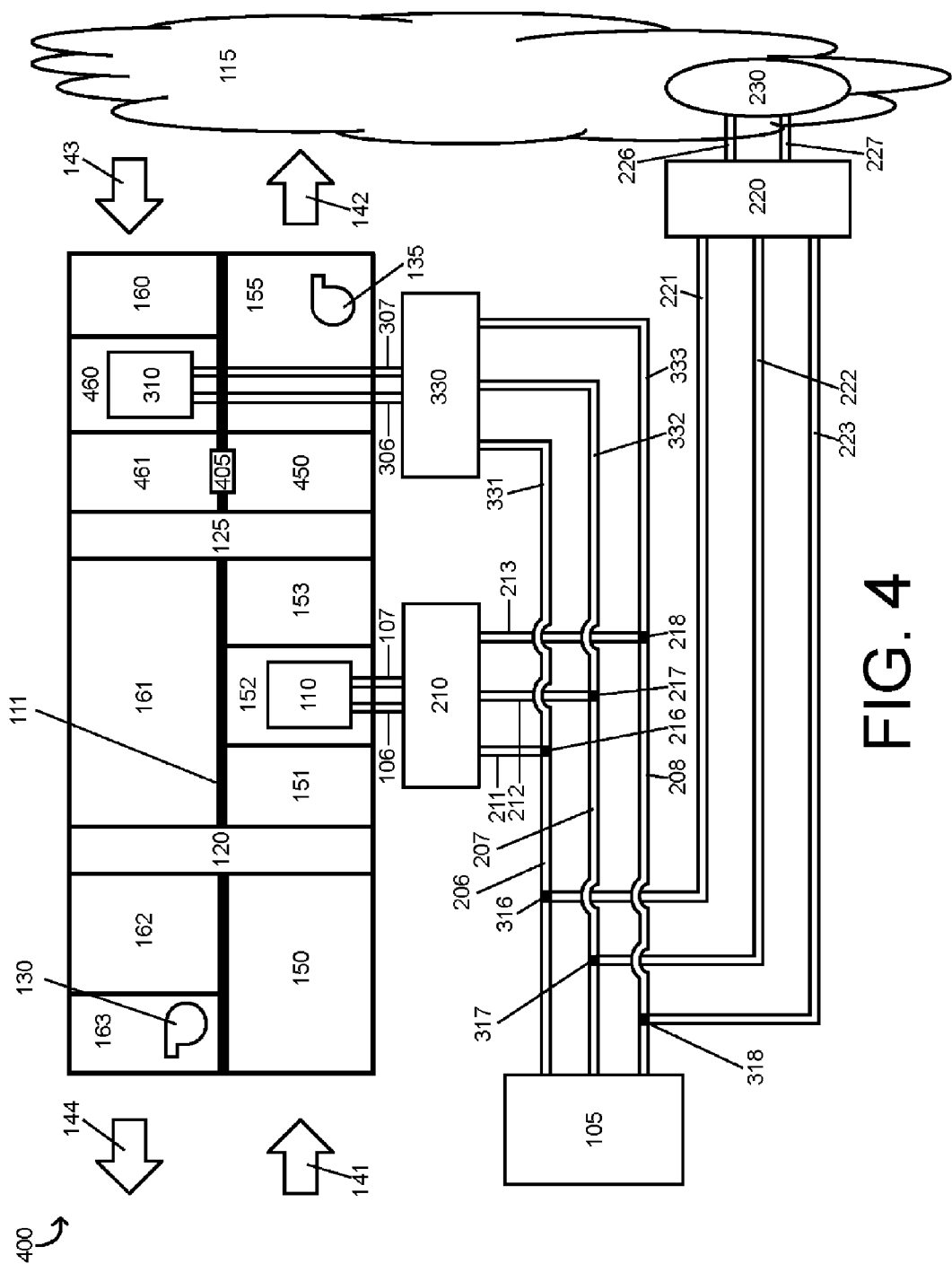
FIG. 4 is a schematic diagram illustrating a high efficiency ventilation system with an auxiliary coil in return air stream.

FIG. 4 is a schematic diagram illustrating a high efficiency ventilation system with an auxiliary coil in return air stream 400. In one or more embodiments, high efficiency ventilation system with an auxiliary coil in return air stream 400 may comprise may comprise a refrigerant flow controlling condensing unit 105, a first branch selector unit 210, a second branch selector unit 220, a third branch selector unit 330, a direct expansion coil 110, a fan coil unit 230, a bypass mechanism 405, and an auxiliary direct expansion coil 310. Illustratively, high efficiency ventilation system with an auxiliary coil in return air stream 400 may be configured to ventilate controlled environment 115 by supplying air at a controlled temperature and humidity via supply air stream 142. In one or more embodiments, high efficiency ventilation system with an auxiliary coil in return air stream 400 may be configured to ventilate controlled environment 115 by exhausting air via exhaust air stream 144. Illustratively, high efficiency ventilation system with an auxiliary coil in return air stream 400 may be configured to control a temperature of controlled environment 115, e.g., fan coil unit 230 may be configured to increase or decrease a temperature of controlled environment 115. During summer conditions, fan coil unit 230 may be configured to decrease a temperature of controlled environment 115. During winter conditions, fan coil unit 230 may be configured to increase a temperature of controlled environment 115. In one or more embodiments, direct expansion coil 110 and auxiliary direct expansion coil 310 may be configured to increase a temperature of outside air stream 141 and fan coil unit 230 may be configured to simultaneously increase a temperature of controlled environment 115. Illustratively, direct expansion coil 110 and auxiliary direct expansion coil 310 may be configured to increase a temperature of outside air stream 141 and fan coil unit 230 may be configured to simultaneously decrease a temperature of controlled environment 115. In one or more embodiments, direct expansion coil 110 may be configured to decrease a temperature of outside air stream 141 and fan coil unit 230 may be configured to simultaneously decrease a temperature of controlled environment 115. Illustratively, direct expansion coil 110 may be configured to decrease a temperature of outside air stream 141 and fan coil unit 230 may be configured to simultaneously increase a temperature of controlled environment 115. In one or more embodiments, high efficiency ventilation system with an auxiliary coil in return air stream 400 may comprise a high efficiency ventilation system in a heat recovery configuration 200. Illustratively, high efficiency ventilation system with an auxiliary coil in return air stream 400 may be configured to recover energy from a first fan coil unit 230 operating in a first mode of operation to improve an operating efficiency of a second fan coil unit 230 operating in a second mode of operation. In one or more embodiments, high efficiency ventilation system with an auxiliary coil in return air stream 400 may be configured to recover energy from one or more fan coil units 230 to improve an operating efficiency of direct expansion coil 110 or auxiliary direct expansion coil 310. Illustratively, high efficiency ventilation system with an auxiliary coil in return air stream 400 may be configured to recover energy from direct expansion coil 110 or auxiliary direct expansion coil 310 to improve an operating efficiency of one or more fan coil units 230.

In one or more embodiments, auxiliary direct expansion coil 310 may be disposed within a sixth return air zone 460, e.g., auxiliary direct expansion coil 310 may be configured to increase or decrease a temperature of air in sixth return air zone 460. Illustratively, auxiliary direct expansion coil 310 may be configured to increase or decrease a temperature of return air stream 143. In one or more embodiments, auxiliary direct expansion coil 310 may comprise a heating-only direct expansion coil 110, e.g., auxiliary direct expansion coil 310 may be configured to increase a temperature of return air stream 143. Illustratively, bypass mechanism 405 may be configured to mechanically control air flow within high efficiency ventilation system with an auxiliary coil in return air stream 400. In one or more embodiments, bypass mechanism 405 may be configured to direct air flow out from one or more supply air zones and into one or more return air zones. Illustratively, bypass mechanism 405 may be configured to direct air flow out from one or more return air zones and into one or more supply air zones. In one or more embodiments, bypass mechanism 405 may be configured to direct return air stream 143 out from a seventh return air zone 461 and into a ninth supply air zone 450, e.g., bypass mechanism 405 may be configured to prevent an ingress of return air stream 143 into second return air zone 161. Illustratively, bypass mechanism 405 may be configured to facilitate an ingress of return air stream 143 into ninth supply air zone 450. In one or more embodiments, auxiliary direct expansion coil 310 may be configured to provide heating capacity to supplement a reduced heating capacity of direct expansion coil 110 during a performance of a maintenance operation on refrigerant flow controlling condensing unit 105. Illustratively, auxiliary direct expansion coil 310 may be configured to increase a temperature of outside air stream 141 during a performance of a maintenance operation on refrigerant flow controlling condensing unit 105. In one or more embodiments, return air stream 143 may ingress first return air zone 160 at a first temperature. Illustratively, auxiliary direct expansion coil 310 may be configured to increase a temperature of air in sixth return air zone 460. In one or more embodiments, return air stream 143 may ingress seventh return air zone 461 at a second temperature wherein the second temperature of return air stream 143 is greater than the first temperature of return air stream 143. Illustratively, bypass mechanism 405 may be configured to direct air at the second temperature out from seventh return air zone 461 and into ninth supply air zone 450, e.g., bypass mechanism 405 may be configured to direct air at the second temperature into ninth supply air zone 450 during a defrost operation to defrost direct expansion coil 110. In one or more embodiments, bypass mechanism 405 may be configured to direct air at the second temperature into ninth supply air zone 450 during a defrost operation to defrost energy recovery ventilator 120. Illustratively, bypass mechanism 405 may be configured to direct air at the second temperature into ninth supply air zone 450 to supplement a reduced heating capacity of direct expansion coil 110. In one or more embodiments, outside air stream 141 may ingress fourth supply air zone 153 at a third temperature. Illustratively, auxiliary direct expansion coil 310 may be configured to increase a temperature of outside air stream 141, e.g., outside air stream 141 may ingress sixth supply air zone 155 at a fourth temperature wherein the fourth temperature of outside air stream 141 is greater than the third temperature of outside air stream 141.

In one or more embodiments, auxiliary direct expansion coil 310 may be configured to increase a temperature of return air stream 143 during a defrost operation to defrost energy recovery ventilator 120. Illustratively, return air stream 143 may ingress first return air zone 160 at a first temperature. In one or more embodiments, auxiliary direct expansion coil 310 may be configured to increase a temperature of air in sixth return air zone 460. Illustratively, return air stream 143 may ingress seventh return air zone 461 at a second temperature wherein the second temperature of return air stream 143 is greater than the first temperature of return air stream 143. In one or more embodiments, return air stream 143 may ingress second return air zone 161 at the second temperature, e.g., return air stream 143 may ingress second return air zone 161 at the second temperature during a defrost operation to defrost energy recovery ventilator 120. Illustratively, direct expansion coil 110 may be configured to simultaneously defrost energy recovery ventilator 120 during a defrost operation to defrost energy recovery ventilator 120.

In one or more embodiments, auxiliary direct expansion coil 310 may be configured to decrease a temperature of return air stream 143 to decrease a temperature of outside air stream 141 in second supply air zone 151. Illustratively, energy recovery ventilator 120 may be configured to improve cooling efficiency of high efficiency ventilation system with an auxiliary coil in return air stream 400 by removing heat from outside air stream 141. In one or more embodiments, energy recovery ventilator 120 may be configured to transfer heat from outside air stream 141 to return air stream 143. Illustratively, auxiliary direct expansion coil 310 may be configured to decrease a temperature of return air stream 143 to increase an amount of heat that energy recovery ventilator 120 is configured to remove from outside air stream 141. In one or more embodiments, return air stream 143 may ingress first return air zone 160 at a first temperature wherein the first temperature is lower than a temperature of outside air stream 141. Illustratively, auxiliary direct expansion coil 310 may be configured to decrease a temperature of return air stream 143. In one or more embodiments, auxiliary direct expansion coil 310 may be configured to decrease a temperature of return air stream 143, e.g., return air stream 143 may ingress second return air zone 161 at a second temperature wherein the second temperature of return air stream 143 is less than the first temperature of return air stream 143. Illustratively, energy recovery ventilator 120 may be configured to transfer more heat from outside air stream 141 to a return air stream 143 at the second temperature than a return air stream 143 at the first temperature. In one or more embodiments, outside air stream 141 may ingress second supply air zone 151 at a lower temperature if return air stream 143 ingresses second return air zone 161 at the second temperature than if return air stream 143 ingresses second return air zone 161 at the first temperature.

In one or more embodiments, auxiliary direct expansion coil 310 may be disposed in first return air zone 160, e.g., auxiliary direct expansion coil 310 may be configured to increase or decrease a temperature of air in first return air zone 160. Illustratively, return air stream 143 may ingress first return air zone 160 at a first temperature and return air stream 143 may egress first return air zone 160 at a second temperature, e.g., return air stream 143 may ingress sixth return air zone 460 at the second temperature. In one or more embodiments, the second temperature of return air stream 143 may be greater than the first temperature of return air stream 143, e.g., auxiliary direct expansion coil 310 may be configured to operate in a heating mode within first return air zone 160. Illustratively, the second temperature of return air stream 143 may be less than the first temperature of return air stream 143, e.g., auxiliary direct expansion coil 310 may be configured to operate in a cooling mode within first return air zone 160.

In one or more embodiments, auxiliary direct expansion coil 310 may be disposed in seventh return air zone 461, e.g., auxiliary direct expansion coil 310 may be configured to increase or decrease a temperature of air in seventh return air zone 461. Illustratively, return air stream 143 may ingress seventh return air zone 461 at a first temperature and return air stream 143 may egress seventh return air zone 461 at a second temperature, e.g., return air stream 143 may ingress second return air zone 161 at the second temperature. In one or more embodiments, the second temperature of return air stream 143 may be greater than the first temperature of return air stream 143, e.g., auxiliary direct expansion coil 310 may be configured to operate in a heating mode within seventh return air zone 461. Illustratively, the second temperature of return air stream 143 may be less than the first temperature of return air stream 143, e.g., auxiliary direct expansion coil 310 may be configured to operate in a cooling mode within seventh return air zone 461.

In one or more embodiments, auxiliary direct expansion coil 310 may be disposed in second return air zone 161, e.g., auxiliary direct expansion coil 310 may be configured to increase or decrease a temperature of air in second return air zone 161. Illustratively, return air stream 143 may ingress second return air zone 161 at a first temperature and return air stream 143 may egress second return air zone 161 at a second temperature, e.g., return air stream 143 may ingress third return air zone 162 at the second temperature. In one or more embodiments, the second temperature of return air stream 143 may be greater than the first temperature of return air stream 143, e.g., auxiliary direct expansion coil 310 may be configured to operate in a heating mode within second return air zone 161. Illustratively, the second temperature of return air stream 143 may be less than the first temperature of return air stream 143, e.g., auxiliary direct expansion coil 310 may be configured to operate in a cooling mode within second return air zone 161.

In one or more embodiments, auxiliary direct expansion coil 310 may be disposed in third return air zone 162, e.g., auxiliary direct expansion coil 310 may be configured to increase or decrease a temperature of air in third return air zone 162. Illustratively, return air stream 143 may ingress third return air zone 162 at a first temperature and return air stream 143 may egress third return air zone 162 at a second temperature, e.g., return air stream 143 may ingress fourth return air zone 163 at the second temperature. In one or more embodiments, the second temperature of return air stream 143 may be greater than the first temperature of return air stream 143, e.g., auxiliary direct expansion coil 310 may be configured to operate in a heating mode within third return air zone 162. Illustratively, the second temperature of return air stream 143 may be less than the first temperature of return air stream 143, e.g., auxiliary direct expansion coil 310 may be configured to operate in a cooling mode within third return air zone 162.

In one or more embodiments, auxiliary direct expansion coil 310 may be disposed in fourth return air zone 163, e.g., auxiliary direct expansion coil 310 may be configured to increase or decrease a temperature of air in fourth return air zone 163. Illustratively, return air stream 143 may ingress fourth return air zone 163 at a first temperature and return air stream 143 may egress fourth return air zone 163 at a second temperature, e.g., return air stream 143 may egress fourth return air zone 163 at the second temperature as exhaust air stream 144. In one or more embodiments, the second temperature of return air stream 143 may be greater than the first temperature of return air stream 143, e.g., auxiliary direct expansion coil 310 may be configured to operate in a heating mode within fourth return air zone 163. Illustratively, the second temperature of return air stream 143 may be less than the first temperature of return air stream 143, e.g., auxiliary direct expansion coil 310 may be configured to operate in a cooling mode within fourth return air zone 163.

In one or more embodiments, high efficiency ventilation system with an auxiliary coil in return air stream 400 may comprise a high efficiency ventilation system in a heat pump configuration 100. Illustratively, direct expansion coil 110 may be directly or indirectly connected to a first refrigerant flow controlling condensing unit 105, e.g., direct expansion coil 110 and a first refrigerant flow controlling condensing unit 105 be configured to operate in a heat pump configuration or a heat recovery configuration. In one or more embodiments, auxiliary direct expansion coil 310 may be directly or indirectly connected to a second refrigerant flow controlling condensing unit 105, e.g., auxiliary direct expansion coil 310 and a second refrigerant flow controlling condensing unit 105 may be configured to operate in a heat pump configuration or a heat recovery configuration. Illustratively, direct expansion coil 110 and a first refrigerant flow controlling condensing unit 105 may be configured to operate in a heat pump configuration and auxiliary direct expansion coil 310 and a second refrigerant flow controlling condensing unit 105 may be configured to simultaneously operate in a heat pump configuration. In one or more embodiments, direct expansion coil 110 and a first refrigerant flow controlling condensing unit 105 may be configured to operate in a heat recovery configuration and auxiliary direct expansion coil 310 and a second refrigerant flow controlling condensing unit 105 may be configured to simultaneously operate in a heat recovery configuration. Illustratively, direct expansion coil 110 and a first refrigerant flow controlling condensing unit 105 may be configured to operate in a heat recovery configuration and auxiliary direct expansion coil 310 and a second refrigerant flow controlling condensing unit 105 may be configured to simultaneously operate in a heat pump configuration. In one or more embodiments, direct expansion coil 110 and a first refrigerant flow controlling condensing unit 105 may be configured to operate in a heat pump configuration and auxiliary direct expansion coil 310 and a second refrigerant flow controlling condensing unit 105 may be configured to simultaneously operate in a heat recovery configuration.

Figure 5:
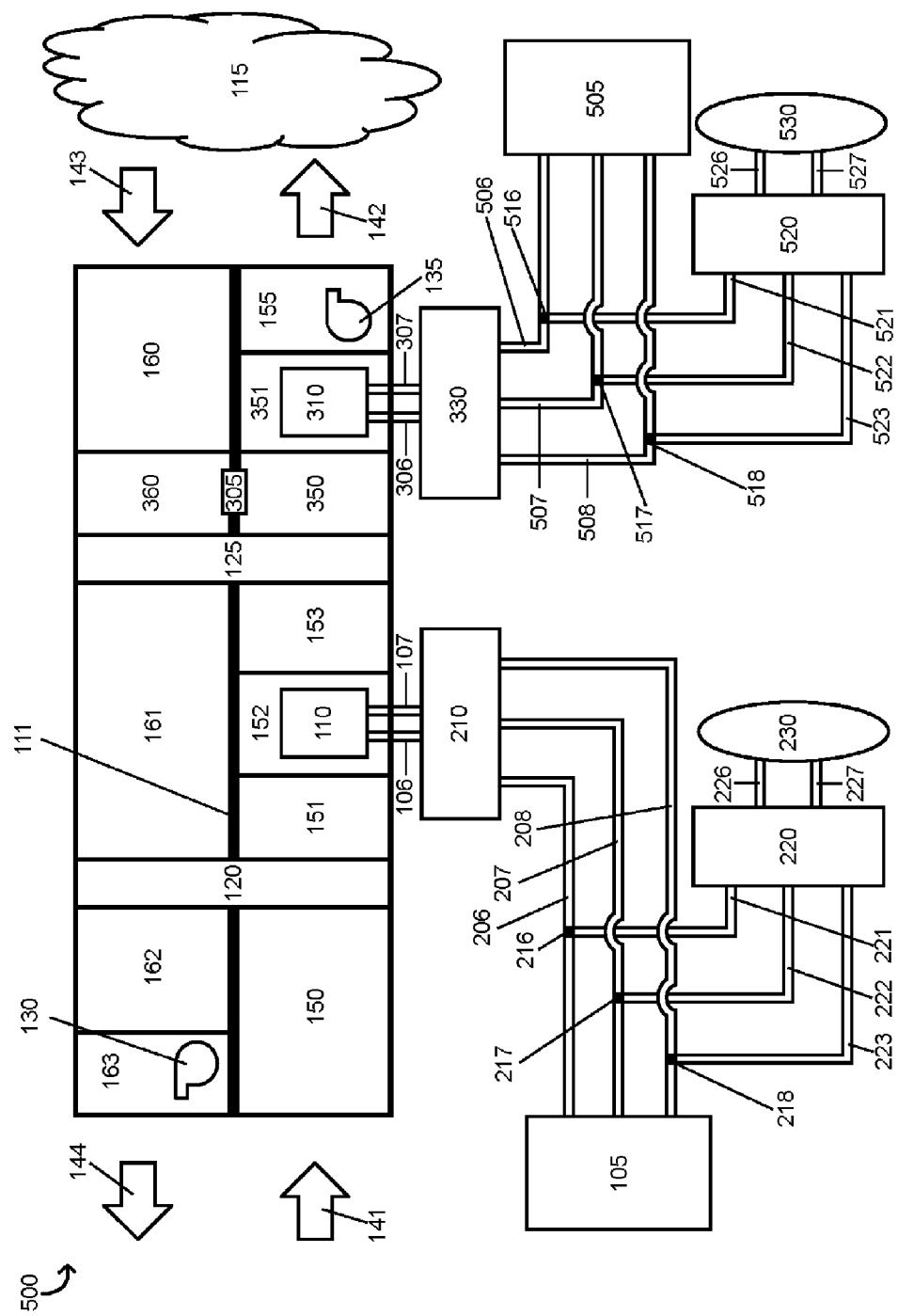
FIG. 5 is a schematic diagram illustrating a high efficiency ventilation system with an auxiliary refrigerant flow controlling condensing unit for outside air stream.

FIG. 5 is a schematic diagram illustrating a high efficiency ventilation system with an auxiliary refrigerant flow controlling condensing unit for outside air stream 500. In one or more embodiments, high efficiency ventilation system with an auxiliary refrigerant flow controlling condensing unit for outside air stream 500 may comprise a refrigerant flow controlling condensing unit 105, an auxiliary refrigerant flow controlling condensing unit 505, a direct expansion coil 110, an auxiliary direct expansion coil 310, a bypass mechanism 305, a first branch selector unit 210, a second branch selector unit 220, a third branch selector unit 330, a fourth branch selector unit 520, a fan coil unit 230, and an auxiliary fan coil unit 530. Illustratively, first branch selector unit 210 may be disposed between refrigerant flow controlling condensing unit 105 and direct expansion coil 110. In one or more embodiments, first branch selector unit 210 may be directly or indirectly connected to direct expansion coil 110 by liquid line 106 and gas and suction line 107. Illustratively, refrigerant flow controlling condensing unit 105 may be configured to facilitate a transfer of a refrigerant from refrigerant flow controlling condensing unit 105 to first branch selector unit 210. In one or more embodiments, refrigerant flow controlling condensing unit 105 may be configured to facilitate a transfer of a refrigerant from first branch selector unit 210 to refrigerant flow controlling condensing unit 105. Illustratively, first branch selector unit 210 may be directly or indirectly connected to refrigerant flow controlling condensing unit 105 by a gas and suction line 206, a suction line 207, and a liquid line 208. In one or more embodiments, first branch selector unit 210 may be connected to gas and suction line 206 at a gas and suction line junction 216, e.g., first branch selector unit 210 may be connected to gas and suction line junction 216 by a first branch selector unit gas and suction line 211. Illustratively, first branch selector unit 210 may be connected to suction line 207 at a suction line junction 217, e.g., first branch selector unit 210 may be connected to suction line junction 217 by a first branch selector unit suction line 212. In one or more embodiments, first branch selector unit 210 may be connected to liquid line 208 at a liquid line junction 218, e.g., first branch selector unit 210 may be connected to liquid line junction 218 by a first branch selector unit liquid line 213. Illustratively, first branch selector unit 210 may be configured to facilitate a transfer of a refrigerant from first branch selector unit 210 to direct expansion coil 110. In one or more embodiments, first branch selector unit 210 may be configured to facilitate a transfer of a refrigerant from direct expansion coil 110 to first branch selector unit 210. Illustratively, first branch selector unit 210 may be configured to facilitate a transfer of a refrigerant from refrigerant flow controlling condensing unit 105 to direct expansion coil 110. In one or more embodiments, first branch selector unit 210 may be configured to facilitate a transfer of a refrigerant from direct expansion coil 110 to refrigerant flow controlling condensing unit 105.

Illustratively, second branch selector unit 220 may be disposed between refrigerant flow controlling condensing unit 105 and fan coil unit 230. In one or more embodiments, second branch selector unit 220 may be directly or indirectly connected to fan coil unit 230 by fan coil liquid line 226 and fan coil gas and suction line 227. Illustratively, refrigerant flow controlling condensing unit 105 may be configured to facilitate a transfer of a refrigerant from refrigerant flow controlling condensing unit 105 to second branch selector unit 220. In one or more embodiments, refrigerant flow controlling condensing unit 105 may be configured to facilitate a transfer of a refrigerant from second branch selector unit 220 to refrigerant flow controlling condensing unit 105. Illustratively, second branch selector unit 220 may be directly or indirectly connected to refrigerant flow controlling condensing unit 105 by gas and suction line 206, suction line 207, and liquid line 208. In one or more embodiments, second branch selector unit 220 may be connected to gas and suction line 206 at gas and suction line junction 216, e.g., second branch selector unit 220 may be connected to gas and suction line junction 216 by a second branch selector unit gas and suction line 221. Illustratively, second branch selector unit 220 may be connected to suction line 207 at suction line junction 217, e.g., second branch selector unit 220 may be connected to suction line junction 217 by a second branch selector unit suction line 222. In one or more embodiments, second branch selector unit 220 may be connected to liquid line 208 at liquid line junction 218, e.g., second branch selector unit 220 may be connected to liquid line junction 218 by a second branch selector unit liquid line 223. Illustratively, second branch selector unit 220 may be configured to facilitate a transfer of a refrigerant from second branch selector unit 220 to fan coil unit 230. In one or more embodiments, second branch selector unit 220 may be configured to facilitate a transfer of a refrigerant from fan coil unit 230 to second branch selector unit 220. Illustratively, second branch selector unit 220 may be configured to facilitate a transfer of a refrigerant from refrigerant flow controlling condensing unit 105 to fan coil unit 230. In one or more embodiments, second branch selector unit 220 may be configured to facilitate a transfer of a refrigerant from fan coil unit 230 to refrigerant flow controlling condensing unit 105.

In one or more embodiments, third branch selector unit 330 may be disposed between auxiliary direct expansion coil 310 and auxiliary refrigerant flow controlling condensing unit 505. Illustratively, third branch selector unit 330 may be directly or indirectly connected to auxiliary direct expansion coil 310 by liquid line 306 and gas and suction line 307. In one or more embodiments, auxiliary refrigerant flow controlling condensing unit 505 may be configured to facilitate a transfer of a refrigerant from auxiliary refrigerant flow controlling condensing unit 505 to third branch selector unit 330. Illustratively, auxiliary refrigerant flow controlling condensing unit 505 may be configured to facilitate a transfer of a refrigerant from third branch selector unit 330 to auxiliary refrigerant flow controlling condensing unit 505. In one or more embodiments, third branch selector unit 330 may be directly or indirectly connected to auxiliary refrigerant flow controlling condensing unit 505 by a gas and suction line 506, a suction line 507, and a liquid line 508. Illustratively, third branch selector unit 330 may be connected to gas and suction line 506 at a gas line junction. In one or more embodiments, third branch selector unit 330 may be connected to suction line 507 at a suction line junction. Illustratively, third branch selector unit 330 may be connected to liquid line 508 at a liquid line junction. In one or more embodiments, third branch selector unit 330 may be configured to facilitate a transfer of a refrigerant from third branch selector unit 330 to auxiliary direct expansion coil 310. Illustratively, third branch selector unit 330 may be configured to facilitate a transfer of a refrigerant from auxiliary direct expansion coil 310 to third branch selector unit 330. In one or more embodiments, third branch selector unit 330 may be configured to facilitate a transfer of a refrigerant from auxiliary refrigerant flow controlling condensing unit 505 to auxiliary direct expansion coil 310. Illustratively, third branch selector unit 330 may be configured to facilitate a transfer of a refrigerant from auxiliary direct expansion coil 310 to auxiliary refrigerant flow controlling condensing unit 505.

Illustratively, fourth branch selector unit 520 may be disposed between auxiliary refrigerant flow controlling condensing unit 505 and auxiliary fan coil unit 530. In one or more embodiments, fourth branch selector unit 520 may be directly or indirectly connected to auxiliary fan coil unit 530 by auxiliary fan coil liquid line 526 and auxiliary fan coil gas and suction line 527. Illustratively, auxiliary refrigerant flow controlling condensing unit 505 may be configured to facilitate a transfer of a refrigerant from auxiliary refrigerant flow controlling condensing unit 505 to fourth branch selector unit 520. In one or more embodiments, auxiliary refrigerant flow controlling condensing unit 505 may be configured to facilitate a transfer of a refrigerant from fourth branch selector unit 520 to auxiliary refrigerant flow controlling condensing unit 505. Illustratively, fourth branch selector unit 520 may be directly or indirectly connected to auxiliary refrigerant flow controlling condensing unit 505 by gas and suction line 506, suction line 507, and liquid line 508. In one or more embodiments, fourth branch selector unit 520 may be connected to gas and suction line 506 at gas and suction line junction 516, e.g., fourth branch selector unit 520 may be connected to gas and suction line junction 516 by a fourth branch selector unit gas and suction line 521. For example, gas and suction line junction 516 may comprise a Refnet joint. Illustratively, fourth branch selector unit 520 may be connected to suction line 507 at suction line junction 517, e.g., fourth branch selector unit 520 may be connected to suction line junction 517 by a fourth branch selector unit suction line 522. For example, suction line 517 may comprise a Refnet joint. In one or more embodiments, fourth branch selector unit 520 may be connected to liquid line 508 at liquid line junction 518, e.g., fourth branch selector unit 520 may be connected to liquid line junction 518 by a fourth branch selector unit liquid line 523. For example, liquid line junction 518 may comprise a Refnet joint. Illustratively, fourth branch selector unit 520 may be configured to facilitate a transfer of a refrigerant from fourth branch selector unit 520 to auxiliary fan coil unit 530. In one or more embodiments, fourth branch selector unit 520 may be configured to facilitate a transfer of a refrigerant from auxiliary fan coil unit 530 to fourth branch selector unit 520. Illustratively, fourth branch selector unit 520 may be configured to facilitate a transfer of a refrigerant from auxiliary refrigerant flow controlling condensing unit 505 to auxiliary fan coil unit 530. In one or more embodiments, fourth branch selector unit 520 may be configured to facilitate a transfer of a refrigerant from auxiliary fan coil unit 530 to auxiliary refrigerant flow controlling condensing unit 505.

Illustratively, first branch selector unit 210, second branch selector unit 220, third branch selector unit 330, and fourth branch selector unit 520 may comprise a single branch selector unit, e.g., first branch selector unit 210, second branch selector unit 220, third branch selector unit 330, and fourth branch selector unit 520 may comprise a multi-port branch selector. In one or more embodiments, first branch selector unit 210, second branch selector unit 220, third branch selector unit 330, and fourth branch selector unit 520 may comprise independent multi-port branch selectors, e.g., first branch selector unit 210 may comprise a first multi-port branch selector, second branch selector unit 220 may comprise a second multi-port branch selector, third branch selector unit 330 may comprise a third multi-port branch selector, and fourth branch selector unit 520 may comprise a fourth multi-port branch selector. Illustratively, first branch selector unit 210, second branch selector unit 220, third branch selector unit 330, and fourth branch selector unit 520 may comprise a single branch circuit controller. In one or more embodiments, first branch selector unit 210, second branch selector unit 220, third branch selector unit 330, and fourth branch selector unit 520 may comprise independent branch circuit controllers, e.g., first branch selector unit 210 may comprise a first branch circuit controller, second branch selector unit 220 may comprise a second branch circuit controller, third branch selector unit 330 may comprise a third branch circuit controller, and fourth branch selector unit 520 may comprise a fourth branch circuit controller. Illustratively, first branch selector unit 210, second branch selector unit 220, third branch selector unit 330, and fourth branch selector unit 520 may comprise a single branch selector box. In one or more embodiments, first branch selector unit 210, second branch selector unit 220, third branch selector unit 330, and fourth branch selector unit 520 may comprise independent branch selector boxes, e.g., first branch selector unit 210 may comprise a first branch selector box, second branch selector unit 220 may comprise a second branch selector box, third branch selector unit 330 may comprise a third branch selector box, and fourth branch selector unit 520 may comprise a fourth branch selector box.

Illustratively, high efficiency ventilation system with an auxiliary refrigerant flow controlling condensing unit for outside air stream 500 may be configured to ventilate controlled environment 115 by supplying air at a controlled temperature and humidity via supply air stream 142. In one or more embodiments, high efficiency ventilation system with an auxiliary refrigerant flow controlling condensing unit for outside air stream 500 may be configured to ventilate controlled environment 115 by exhausting air via exhaust air stream 144. Illustratively, high efficiency ventilation system with an auxiliary refrigerant flow controlling condensing unit for outside air stream 500 may be configured to control a temperature of controlled environment 115, e.g., fan coil unit 230 may be configured to increase or decrease a temperature of controlled environment 115. In one or more embodiments, auxiliary fan coil unit 530 may be configured to control a temperature of controlled environment 115, e.g., auxiliary fan coil unit 530 may be configured to increase or decrease a temperature of controlled environment 115. In one or more embodiments, fan coil unit 230 may be configured to control a temperature of a first zone of controlled environment 115 and auxiliary fan coil unit 530 may be configured to control a temperature of a second zone of controlled environment 115. Illustratively, fan coil unit 230 and auxiliary fan coil unit 530 may be configured to simultaneously control a temperature of a first zone of controlled environment 115 and a temperature of a second zone of controlled environment 115.

In one or more embodiments, fan coil unit 230 may be configured to control a temperature of a first controlled environment 115, e.g., fan coil unit 230 may be configured to increase or decrease a temperature of the first controlled environment 115. Illustratively, auxiliary fan coil unit 530 may be configured to control a temperature of a second controlled environment 115, e.g., auxiliary fan coil unit 530 may be configured to increase or decrease a temperature of the second controlled environment 115. In one or more embodiments, fan coil unit 230 and auxiliary fan coil unit 530 may be configured to simultaneously control a temperature of a first controlled environment 115 and a temperature of a second controlled environment 115. During summer conditions, fan coil unit 230 may be configured to decrease a temperature of a first controlled environment 115 and auxiliary fan coil unit 530 may be configured to decrease a temperature of a second controlled environment 115. During winter conditions, fan coil unit 230 may be configured to increase a temperature of a first controlled environment 115 and auxiliary fan coil unit 530 may be configured to increase a temperature of a second controlled environment 115. In one or more embodiments, direct expansion coil 110 and auxiliary direct expansion coil 310 may be configured to increase a temperature of outside air stream 141 and fan coil unit 230 may be configured to simultaneously increase a temperature of a first controlled environment 115, e.g., auxiliary fan coil unit 530 may be configured to simultaneously increase a temperature of a second controlled environment 115. Illustratively, direct expansion coil 110 and auxiliary direct expansion coil 310 may be configured to increase a temperature of outside air stream 141 and fan coil unit 230 may be configured to simultaneously increase or decrease a temperature of a first controlled environment 115, e.g., auxiliary fan coil unit 530 may be configured to simultaneously increase or decrease a temperature of a second controlled environment 115. In one or more embodiments, direct expansion coil 110 and auxiliary direct expansion coil 310 may be configured to increase a temperature of outside air stream 141 and fan coil unit 230 may be configured to simultaneously increase or decrease a temperature of a first controlled environment 115, e.g., auxiliary fan coil unit 530 may be configured to simultaneously increase or decrease a temperature of a second controlled environment 115.

In one or more embodiments, high efficiency ventilation system with an auxiliary refrigerant flow controlling condensing unit for outside air stream 500 may comprise a high efficiency ventilation system in a heat recovery configuration 200. Illustratively, high efficiency ventilation system with an auxiliary refrigerant flow controlling condensing unit for outside air stream 500 may be configured to recover energy from a first fan coil unit 230 operating in a first mode of operation to improve an operating efficiency of a second fan coil unit 230 operating in a second mode of operation. In one or more embodiments, high efficiency ventilation system with an auxiliary refrigerant flow controlling condensing unit for outside air stream 500 may be configured to recover energy from a first auxiliary fan coil unit 530 operating in a first mode of operation to improve an operating efficiency of a second auxiliary fan coil unit 530 operating in a second mode of operation. Illustratively, high efficiency ventilation system with an auxiliary refrigerant flow controlling condensing unit for outside air stream 500 may be configured to recover energy from one or more fan coil units 230 or one or more auxiliary fan coil units 530 to improve an operating efficiency of direct expansion coil 110 or auxiliary direct expansion coil 310. In one or more embodiments, high efficiency ventilation system with an auxiliary refrigerant flow controlling condensing unit for outside air stream 500 may be configured to recover energy from one or more fan coil units 230 to improve an operating efficiency of direct expansion coil 110. Illustratively, high efficiency ventilation system with an auxiliary refrigerant flow controlling condensing unit for outside air stream 500 may be configured to recover energy from one or more auxiliary fan coil units 530 to improve an operating efficiency of auxiliary direct expansion coil 310. In one or more embodiments, high efficiency ventilation system with an auxiliary refrigerant flow controlling condensing unit for outside air stream 500 may be configured to recover energy from direct expansion coil 110 or auxiliary direct expansion coil 310 to improve an operating efficiency of one or more fan coil units 230 or one or more auxiliary fan coil units 530. Illustratively, high efficiency ventilation system with an auxiliary refrigerant flow controlling condensing unit for outside air stream 500 may be configured to recovery energy from direct expansion coil 110 to improve an operating efficiency of one or more fan coil units 230. In one or more embodiments, high efficiency ventilation system with an auxiliary refrigerant flow controlling condensing unit for outside air stream 500 may be configured to recover energy from auxiliary direct expansion coil 310 to improve an operating efficiency of one or more auxiliary fan coil units 530.

Illustratively, high efficiency ventilation system with an auxiliary refrigerant flow controlling condensing unit for outside air stream 500 may be configured to selectively distribute heat recovered from one or more fan coil units 230 and one or more auxiliary fan coil units 530, e.g., high efficiency ventilation system with an auxiliary refrigerant flow controlling condensing unit for outside air stream 500 may be configured to uniformly distribute heat recovered from one or more fan coil units 230 and one or more auxiliary fan coil units 530. In one or more embodiments, high efficiency ventilation system with an auxiliary refrigerant flow controlling condensing unit for outside air stream 500 may be configured to distribute heat recovered from one or more fan coil units 230 and one or more auxiliary fan coil units 530 according to one or more distribution variables, e.g., high efficiency ventilation system with an auxiliary refrigerant flow controlling condensing unit for outside air stream 500 may be configured to distribute heat recovered from one or more fan coil units 230 and one or more auxiliary fan coil units 530 according to one or more distribution priorities. Illustratively, a particular fan coil unit 230 may have a higher distribution priority than direct expansion coil 110, e.g., refrigerant flow controlling condensing unit 105 may be configured to distribute heat recovered from one or more fan coil units 230 to the particular fan coil unit 230 before distributing heat recovered from one or more fan coil units 230 to direct expansion coil 110. For example, refrigerant flow controlling condensing unit 105 may be configured to distribute heat recovered from one or more fan coil units 230 to direct expansion coil 110 only if the particular fan coil unit 230 is either in a standby mode or is operating in a cooling mode. In one or more embodiments, refrigerant flow controlling condensing unit 105 may be configured to distribute heat recovered from one or more fan coil units 230 to direct expansion coil 110 only if each fan coil unit 230 of the one or more fan coil units 230 is either in a standby mode or is operating in a cooling mode. Illustratively, a particular auxiliary fan coil unit 530 may have a higher distribution priority than auxiliary direct expansion coil 310, e.g., auxiliary refrigerant flow controlling condensing unit 505 may be configured to distribute heat recovered from one or more auxiliary fan coil units 530 to the particular auxiliary fan coil unit 530 before distributing heat recovered from one or more auxiliary fan coil units 530 to auxiliary direct expansion coil 310. For example, auxiliary refrigerant flow controlling condensing unit 505 may be configured to distribute heat recovered from one or more auxiliary fan coil units 530 to auxiliary direct expansion coil 310 only if the particular auxiliary fan coil unit 530 is either in a standby mode or is operating in a cooling mode. In one or more embodiments, auxiliary refrigerant flow controlling condensing unit 505 may be configured to distribute heat recovered from one or more auxiliary fan coil units 530 to auxiliary direct expansion coil 310 only if each auxiliary fan coil unit 530 of the one or more auxiliary fan coil units 530 is either in a standby mode or is operating in a cooling mode.

Illustratively, refrigerant flow controlling condensing unit 105 may be configured to communicate information about excess heating capacity to auxiliary refrigerant flow controlling condensing unit 505 to improve an operating efficiency of high efficiency ventilation system with an auxiliary refrigerant flow controlling condensing unit for outside air stream 500. In one or more embodiments, refrigerant flow controlling condenses ing unit 105 may be configured to communicate information about heat recovered from one or more fan coil units 230 to auxiliary refrigerant flow controlling condensing unit 505, e.g., refrigerant flow controlling condensing unit 105 may be configured to communicate to auxiliary refrigerant flow controlling condensing unit 505 that recovered heat is available for direct expansion coil 110. Illustratively, auxiliary refrigerant flow controlling condensing unit 505 may be configured to receive information from refrigerant flow controlling condensing unit 105 and then adjust a heating capacity of auxiliary direct expansion coil 310, e.g., auxiliary refrigerant flow controlling condensing unit 505 may be configured to decrease a heating capacity of auxiliary direct expansion coil 310 in response to a communication that heat recovered from one or more fan coil units 230 is available for direct expansion coil 110. In one or more embodiments, auxiliary refrigerant flow controlling condensing unit 505 may be configured to communicate information about excess heating capacity to refrigerant flow controlling condensing unit 105 to improve an operating efficiency of high efficiency ventilation system with an auxiliary refrigerant flow controlling condensing unit for outside air stream 500. Illustratively, auxiliary refrigerant flow controlling condensing unit 505 may be configured to communicate information about heat recovered from one or more auxiliary fan coil units 530 to refrigerant flow controlling condensing unit 105, e.g., auxiliary refrigerant flow controlling condensing unit 505 may be configured to communicate to refrigerant flow controlling condensing unit 105 that recovered heat is available for auxiliary direct expansion coil 310. In one or more embodiments, refrigerant flow controlling condensing unit 105 may be configured to receive information from auxiliary refrigerant flow controlling condensing unit 505 and then adjust a heating capacity of direct expansion coil 110, e.g., refrigerant flow controlling condensing unit 105 may be configured to decrease a heating capacity of direct expansion coil 110 in response to a communication that heat recovered from one or more auxiliary fan coil units 530 is available for auxiliary direct expansion coil 310.

Figure 6:
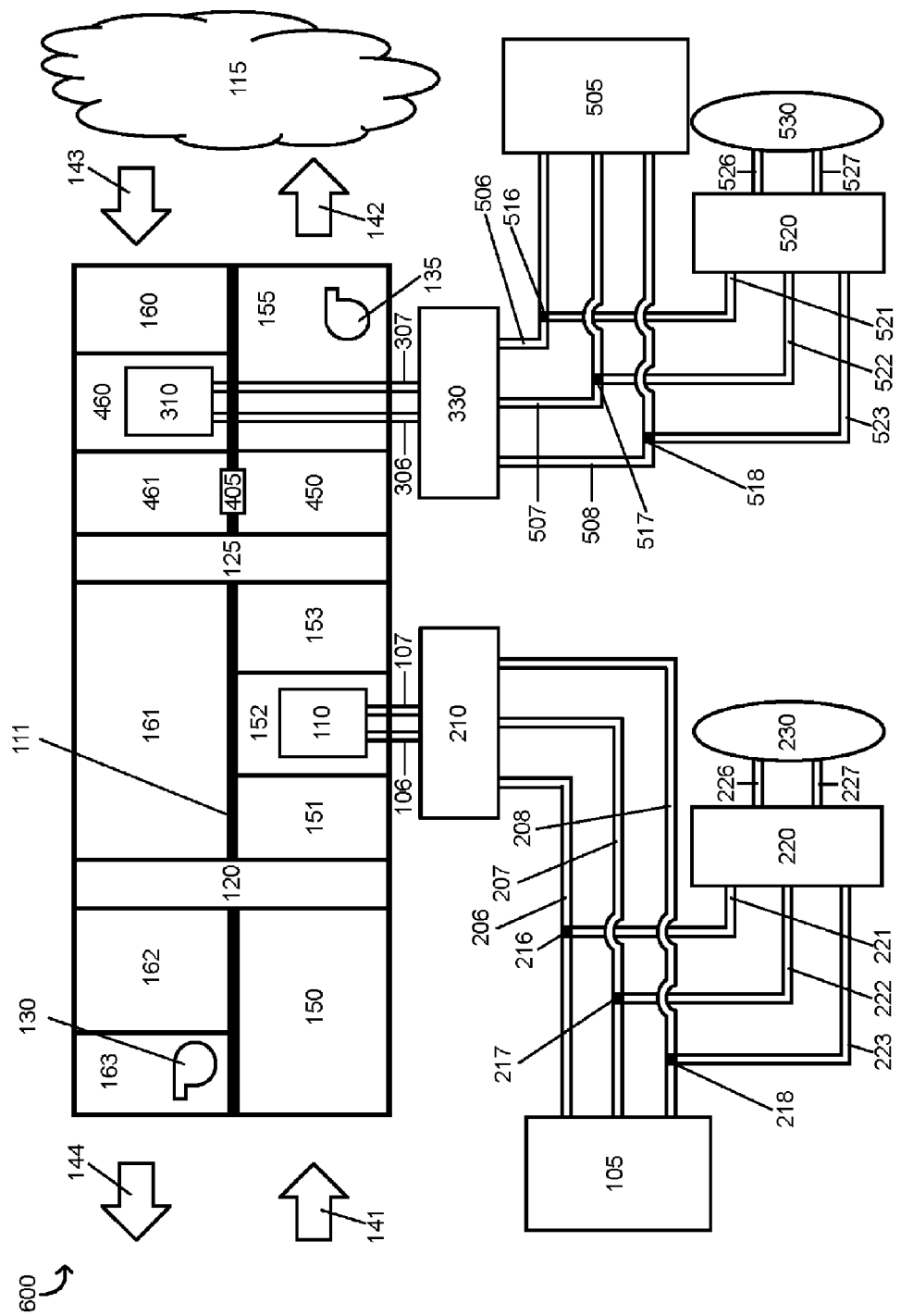
FIG. 6 is a schematic diagram illustrating a high efficiency ventilation system with an auxiliary refrigerant flow controlling condensing unit for return air stream.

FIG. 6 is a schematic diagram illustrating a high efficiency ventilation system with an auxiliary refrigerant flow controlling condensing unit for return air stream 600. In one or more embodiments, high efficiency ventilation system with an auxiliary refrigerant flow controlling condensing unit for return air stream 600 may comprise a refrigerant flow controlling condensing unit 105, an auxiliary refrigerant flow controlling condensing unit 505, a direct expansion coil 110, an auxiliary direct expansion coil 310, a bypass mechanism 305, a first branch selector unit 210, a second branch selector unit 220, a third branch selector unit 330, a fourth branch selector unit 520, a fan coil unit 230, and an auxiliary fan coil unit 530. Illustratively, first branch selector unit 210 may be disposed between refrigerant flow controlling condensing unit 105 and direct expansion coil 110. In one or more embodiments, first branch selector unit 210 may be directly or indirectly connected to direct expansion coil 110 by liquid line 106 and gas and suction line 107. Illustratively, refrigerant flow controlling condensing unit 105 may be configured to facilitate a transfer of a refrigerant from refrigerant flow controlling condensing unit 105 to first branch selector unit 210. In one or more embodiments, refrigerant flow controlling condensing unit 105 may be configured to facilitate a transfer of a refrigerant from first branch selector unit 210 to refrigerant flow controlling condensing unit 105. Illustratively, first branch selector unit 210 may be directly or indirectly connected to refrigerant flow controlling condensing unit 105 by a gas and suction line 206, a suction line 207, and a liquid line 208. In one or more embodiments, first branch selector unit 210 may be connected to gas and suction line 206 at a gas and suction line junction 216, e.g., first branch selector unit 210 may be connected to gas and suction line junction 216 by a first branch selector unit gas and suction line 211. Illustratively, first branch selector unit 210 may be connected to suction line 207 at a suction line junction 217, e.g., first branch selector unit 210 may be connected to suction line junction 217 by a first branch selector unit suction line 212. In one or more embodiments, first branch selector unit 210 may be connected to liquid line 208 at a liquid line junction 218, e.g., first branch selector unit 210 may be connected to liquid line junction 218 by a first branch selector unit liquid line 213. Illustratively, first branch selector unit 210 may be configured to facilitate a transfer of a refrigerant from first branch selector unit 210 to direct expansion coil 110. In one or more embodiments, first branch selector unit 210 may be configured to facilitate a transfer of a refrigerant from direct expansion coil 110 to first branch selector unit 210. Illustratively, first branch selector unit 210 may be configured to facilitate a transfer of a refrigerant from refrigerant flow controlling condensing unit 105 to direct expansion coil 110. In one or more embodiments, first branch selector unit 210 may be configured to facilitate a transfer of a refrigerant from direct expansion coil 110 to refrigerant flow controlling condensing unit 105.

Illustratively, second branch selector unit 220 may be disposed between refrigerant flow controlling condensing unit 105 and fan coil unit 230. In one or more embodiments, second branch selector unit 220 may be directly or indirectly connected to fan coil unit 230 by fan coil liquid line 226 and fan coil gas and suction line 227. Illustratively, refrigerant flow controlling condensing unit 105 may be configured to facilitate a transfer of a refrigerant from refrigerant flow controlling condensing unit 105 to second branch selector unit 220. In one or more embodiments, refrigerant flow controlling condensing unit 105 may be configured to facilitate a transfer of a refrigerant from second branch selector unit 220 to refrigerant flow controlling condensing unit 105. Illustratively, second branch selector unit 220 may be directly or indirectly connected to refrigerant flow controlling condensing unit 105 by gas and suction line 206, suction line 207, and liquid line 208. In one or more embodiments, second branch selector unit 220 may be connected to gas and suction line 206 at gas and suction line junction 216, e.g., second branch selector unit 220 may be connected to gas and suction line junction 216 by a second branch selector unit gas and suction line 221. Illustratively, second branch selector unit 220 may be connected to suction line 207 at suction line junction 217, e.g., second branch selector unit 220 may be connected to suction line junction 217 by a second branch selector unit suction line 222. In one or more embodiments, second branch selector unit 220 may be connected to liquid line 208 at liquid line junction 218, e.g., second branch selector unit 220 may be connected to liquid line junction 218 by a second branch selector unit liquid line 223. Illustratively, second branch selector unit 220 may be configured to facilitate a transfer of a refrigerant from second branch selector unit 220 to fan coil unit 230. In one or more embodiments, second branch selector unit 220 may be configured to facilitate a transfer of a refrigerant from fan coil unit 230 to second branch selector unit 220. Illustratively, second branch selector unit 220 may be configured to facilitate a transfer of a refrigerant from refrigerant flow controlling condensing unit 105 to fan coil unit 230. In one or more embodiments, second branch selector unit 220 may be configured to facilitate a transfer of a refrigerant from fan coil unit 230 to refrigerant flow controlling condensing unit 105.

In one or more embodiments, third branch selector unit 330 may be disposed between auxiliary direct expansion coil 310 and auxiliary refrigerant flow controlling condensing unit 505. Illustratively, third branch selector unit 330 may be directly or indirectly connected to auxiliary direct expansion coil 310 by liquid line 306 and gas and suction line 307. In one or more embodiments, auxiliary refrigerant flow controlling condensing unit 505 may be configured to facilitate a transfer of a refrigerant from auxiliary refrigerant flow controlling condensing unit 505 to third branch selector unit 330. Illustratively, auxiliary refrigerant flow controlling condensing unit 505 may be configured to facilitate a transfer of a refrigerant from third branch selector unit 330 to auxiliary refrigerant flow controlling condensing unit 505. In one or more embodiments, third branch selector unit 330 may be directly or indirectly connected to auxiliary refrigerant flow controlling condensing unit 505 by a gas and suction line 506, a suction line 507, and a liquid line 508. Illustratively, third branch selector unit 330 may be connected to gas and suction line 506 at a gas line junction. In one or more embodiments, third branch selector unit 330 may be connected to suction line 507 at a suction line junction. Illustratively, third branch selector unit 330 may be connected to liquid line 508 at a liquid line junction. In one or more embodiments, third branch selector unit 330 may be configured to facilitate a transfer of a refrigerant from third branch selector unit 330 to auxiliary direct expansion coil 310. Illustratively, third branch selector unit 330 may be configured to facilitate a transfer of a refrigerant from auxiliary direct expansion coil 310 to third branch selector unit 330. In one or more embodiments, third branch selector unit 330 may be configured to facilitate a transfer of a refrigerant from auxiliary refrigerant flow controlling condensing unit 505 to auxiliary direct expansion coil 310. Illustratively, third branch selector unit 330 may be configured to facilitate a transfer of a refrigerant from auxiliary direct expansion coil 310 to auxiliary refrigerant flow controlling condensing unit 505.

Illustratively, fourth branch selector unit 520 may be disposed between auxiliary refrigerant flow controlling condensing unit 505 and auxiliary fan coil unit 530. In one or more embodiments, fourth branch selector unit 520 may be directly or indirectly connected to auxiliary fan coil unit 530 by auxiliary fan coil liquid line 526 and auxiliary fan coil gas and suction line 527. Illustratively, auxiliary refrigerant flow controlling condensing unit 505 may be configured to facilitate a transfer of a refrigerant from auxiliary refrigerant flow controlling condensing unit 505 to fourth branch selector unit 520. In one or more embodiments, auxiliary refrigerant flow controlling condensing unit 505 may be configured to facilitate a transfer of a refrigerant from fourth branch selector unit 520 to auxiliary refrigerant flow controlling condensing unit 505. Illustratively, fourth branch selector unit 520 may be directly or indirectly connected to auxiliary refrigerant flow controlling condensing unit 505 by gas and suction line 506, suction line 507, and liquid line 508. In one or more embodiments, fourth branch selector unit 520 may be connected to gas and suction line 506 at gas and suction line junction 516, e.g., fourth branch selector unit 520 may be connected to gas and suction line junction 516 by a fourth branch selector unit gas and suction line 521. Illustratively, fourth branch selector unit 520 may be connected to suction line 507 at suction line junction 517, e.g., fourth branch selector unit 520 may be connected to suction line junction 517 by a fourth branch selector unit suction line 522. In one or more embodiments, fourth branch selector unit 520 may be connected to liquid line 508 at liquid line junction 518, e.g., fourth branch selector unit 520 may be connected to liquid line junction 518 by a fourth branch selector unit liquid line 523. Illustratively, fourth branch selector unit 520 may be configured to facilitate a transfer of a refrigerant from fourth branch selector unit 520 to auxiliary fan coil unit 530. In one or more embodiments, fourth branch selector unit 520 may be configured to facilitate a transfer of a refrigerant from auxiliary fan coil unit 530 to fourth branch selector unit 520. Illustratively, fourth branch selector unit 520 may be configured to facilitate a transfer of a refrigerant from auxiliary refrigerant flow controlling condensing unit 505 to auxiliary fan coil unit 530. In one or more embodiments, fourth branch selector unit 520 may be configured to facilitate a transfer of a refrigerant from auxiliary fan coil unit 530 to auxiliary refrigerant flow controlling condensing unit 505.

Illustratively, high efficiency ventilation system with an auxiliary refrigerant flow controlling condensing unit for return air stream 600 may be configured to ventilate controlled environment 115 by supplying air at a controlled temperature and humidity via supply air stream 142. In one or more embodiments, high efficiency ventilation system with an auxiliary refrigerant flow controlling condensing unit for return air stream 600 may be configured to ventilate controlled environment 115 by exhausting air via exhaust air stream 144. Illustratively, high efficiency ventilation system with an auxiliary refrigerant flow controlling condensing unit for return air stream 600 may be configured to control a temperature of controlled environment 115, e.g., fan coil unit 230 may be configured to increase or decrease a temperature of controlled environment 115. In one or more embodiments, auxiliary fan coil unit 530 may be configured to control a temperature of controlled environment 115, e.g., auxiliary fan coil unit 530 may be configured to increase or decrease a temperature of controlled environment 115. In one or more embodiments, fan coil unit 230 may be configured to control a temperature of a first zone of controlled environment 115 and auxiliary fan coil unit 530 may be configured to control a temperature of a second zone of controlled environment 115. Illustratively, fan coil unit 230 and auxiliary fan coil unit 530 may be configured to simultaneously control a temperature of a first zone of controlled environment 115 and a temperature of a second zone of controlled environment 115.

In one or more embodiments, fan coil unit 230 may be configured to control a temperature of a first controlled environment 115, e.g., fan coil unit 230 may be configured to increase or decrease a temperature of the first controlled environment 115. Illustratively, auxiliary fan coil unit 530 may be configured to control a temperature of a second controlled environment 115, e.g., auxiliary fan coil unit 530 may be configured to increase or decrease a temperature of the second controlled environment 115. In one or more embodiments, fan coil unit 230 and auxiliary fan coil unit 530 may be configured to simultaneously control a temperature of a first controlled environment 115 and a temperature of a second controlled environment 115. During summer conditions, fan coil unit 230 may be configured to decrease a temperature of a first controlled environment 115 and auxiliary fan coil unit 530 may be configured to decrease a temperature of a second controlled environment 115. During winter conditions, fan coil unit 230 may be configured to increase a temperature of a first controlled environment 115 and auxiliary fan coil unit 530 may be configured to increase a temperature of a second controlled environment 115. In one or more embodiments, direct expansion coil 110 and auxiliary direct expansion coil 310 may be configured to increase a temperature of outside air stream 141 and fan coil unit 230 may be configured to simultaneously increase a temperature of a first controlled environment 115, e.g., auxiliary fan coil unit 530 may be configured to simultaneously increase a temperature of a second controlled environment 115. Illustratively, direct expansion coil 110 and auxiliary direct expansion coil 310 may be configured to increase a temperature of outside air stream 141 and fan coil unit 230 may be configured to simultaneously increase or decrease a temperature of a first controlled environment 115, e.g., auxiliary fan coil unit 530 may be configured to simultaneously increase or decrease a temperature of a second controlled environment 115. In one or more embodiments, direct expansion coil 110 and auxiliary direct expansion coil 310 may be configured to increase a temperature of outside air stream 141 and fan coil unit 230 may be configured to simultaneously increase or decrease a temperature of a first controlled environment 115, e.g., auxiliary fan coil unit 530 may be configured to simultaneously increase or decrease a temperature of a second controlled environment 115.

In one or more embodiments, high efficiency ventilation system with an auxiliary refrigerant flow controlling condensing unit for return air stream 600 may comprise a high efficiency ventilation system in a heat recovery configuration 200. Illustratively, high efficiency ventilation system with an auxiliary refrigerant flow controlling condensing unit for return air stream 600 may be configured to recover energy from a first fan coil unit 230 operating in a first mode of operation to improve an operating efficiency of a second fan coil unit 230 operating in a second mode of operation. In one or more embodiments, high efficiency ventilation system with an auxiliary refrigerant flow controlling condensing unit for return air stream 600 may be configured to recover energy from a first auxiliary fan coil unit 530 operating in a first mode of operation to improve an operating efficiency of a second auxiliary fan coil unit 530 operating in a second mode of operation. Illustratively, high efficiency ventilation system with an auxiliary refrigerant flow controlling condensing unit for return air stream 600 may be configured to recover energy from one or more fan coil units 230 or one or more auxiliary fan coil units 530 to improve an operating efficiency of direct expansion coil 110 or auxiliary direct expansion coil 310. In one or more embodiments, high efficiency ventilation system with an auxiliary refrigerant flow controlling condensing unit for return air stream 600 may be configured to recover energy from one or more fan coil units 230 to improve an operating efficiency of direct expansion coil 110. Illustratively, high efficiency ventilation system with an auxiliary refrigerant flow controlling condensing unit for return air stream 600 may be configured to recover energy from one or more auxiliary fan coil units 530 to improve an operating efficiency of auxiliary direct expansion coil 310. In one or more embodiments, high efficiency ventilation system with an auxiliary refrigerant flow controlling condensing unit for return air stream 600 may be configured to recover energy from direct expansion coil 110 or auxiliary direct expansion coil 310 to improve an operating efficiency of one or more fan coil units 230 or one or more auxiliary fan coil units 530. Illustratively, high efficiency ventilation system with an auxiliary refrigerant flow controlling condensing unit for return air stream 600 may be configured to recovery energy from direct expansion coil 110 to improve an operating efficiency of one or more fan coil units 230. In one or more embodiments, high efficiency ventilation system with an auxiliary refrigerant flow controlling condensing unit for return air stream 600 may be configured to recover energy from auxiliary direct expansion coil 310 to improve an operating efficiency of one or more auxiliary fan coil units 530.

Illustratively, high efficiency ventilation system with an auxiliary refrigerant flow controlling condensing unit for return air stream 600 may be configured to selectively distribute heat recovered from one or more fan coil units 230 and one or more auxiliary fan coil units 530, e.g., high efficiency ventilation system with an auxiliary refrigerant flow controlling condensing unit for return air stream 600 may be configured to uniformly distribute heat recovered from one or more fan coil units 230 and one or more auxiliary fan coil units 530. In one or more embodiments, high efficiency ventilation system with an auxiliary refrigerant flow controlling condensing unit for return air stream 600 may be configured to distribute heat recovered from one or more fan coil units 230 and one or more auxiliary fan coil units 530 according to one or more distribution variables, e.g., high efficiency ventilation system with an auxiliary refrigerant flow controlling condensing unit for return air stream 600 may be configured to distribute heat recovered from one or more fan coil units 230 and one or more auxiliary fan coil units 530 according to one or more distribution priorities. Illustratively, a particular fan coil unit 230 may have a higher distribution priority than direct expansion coil 110, e.g., refrigerant flow controlling condensing unit 105 may be configured to distribute heat recovered from one or more fan coil units 230 to the particular fan coil unit 230 before distributing heat recovered from one or more fan coil units 230 to direct expansion coil 110. For example, refrigerant flow controlling condensing unit 105 may be configured to distribute heat recovered from one or more fan coil units 230 to direct expansion coil 110 only if the particular fan coil unit 230 is either in a standby mode or is operating in a cooling mode. In one or more embodiments, refrigerant flow controlling condensing unit 105 may be configured to distribute heat recovered from one or more fan coil units 230 to direct expansion coil 110 only if each fan coil unit 230 of the one or more fan coil units 230 is either in a standby mode or is operating in a cooling mode. Illustratively, a particular auxiliary fan coil unit 530 may have a higher distribution priority than auxiliary direct expansion coil 310, e.g., auxiliary refrigerant flow controlling condensing unit 505 may be configured to distribute heat recovered from one or more auxiliary fan coil units 530 to the particular auxiliary fan coil unit 530 before distributing heat recovered from one or more auxiliary fan coil units 530 to auxiliary direct expansion coil 310. For example, auxiliary refrigerant flow controlling condensing unit 505 may be configured to distribute heat recovered from one or more auxiliary fan coil units 530 to auxiliary direct expansion coil 310 only if the particular auxiliary fan coil unit 530 is either in a standby mode or is operating in a cooling mode. In one or more embodiments, auxiliary refrigerant flow controlling condensing unit 505 may be configured to distribute heat recovered from one or more auxiliary fan coil units 530 to auxiliary direct expansion coil 310 only if each auxiliary fan coil unit 530 of the one or more auxiliary fan coil units 530 is either in a standby mode or is operating in a cooling mode.

Illustratively, refrigerant flow controlling condensing unit 105 may be configured to communicate information about excess heating capacity to auxiliary refrigerant flow controlling condensing unit 505 to improve an operating efficiency of high efficiency ventilation system with an auxiliary refrigerant flow controlling condensing unit for return air stream 600. In one or more embodiments, refrigerant flow controlling condensing unit 105 may be configured to communicate information about heat recovered from one or more fan coil units 230 to auxiliary refrigerant flow controlling condensing unit 505, e.g., refrigerant flow controlling condensing unit 105 may be configured to communicate to auxiliary refrigerant flow controlling condensing unit 505 that recovered heat is available for direct expansion coil 110. Illustratively, auxiliary refrigerant flow controlling condensing unit 505 may be configured to receive information from refrigerant flow controlling condensing unit 105 and then adjust a heating capacity of auxiliary direct expansion coil 310, e.g., auxiliary refrigerant flow controlling condensing unit 505 may be configured to decrease a heating capacity of auxiliary direct expansion coil 310 in response to a communication that heat recovered from one or more fan coil units 230 is available for direct expansion coil 110. In one or more embodiments, auxiliary refrigerant flow controlling condensing unit 505 may be configured to communicate information about excess heating capacity to refrigerant flow controlling condensing unit 105 to improve an operating efficiency of high efficiency ventilation system with an auxiliary refrigerant flow controlling condensing unit for return air stream 600. Illustratively, auxiliary refrigerant flow controlling condensing unit 505 may be configured to communicate information about heat recovered from one or more auxiliary fan coil units 530 to refrigerant flow controlling condensing unit 105, e.g., auxiliary refrigerant flow controlling condensing unit 505 may be configured to communicate to refrigerant flow controlling condensing unit 105 that recovered heat is available for auxiliary direct expansion coil 310. In one or more embodiments, refrigerant flow controlling condensing unit 105 may be configured to receive information from auxiliary refrigerant flow controlling condensing unit 505 and then adjust a heating capacity of direct expansion coil 110, e.g., refrigerant flow controlling condensing unit 105 may be configured to decrease a heating capacity of direct expansion coil 110 in response to a communication that heat recovered from one or more auxiliary fan coil units 530 is available for auxiliary direct expansion coil 310.

The foregoing description has been directed to particular embodiments of this invention. It will be apparent; however, that other variations and modifications may be made to the described embodiments, with the attainment of some or all of their advantages. Specifically, it should be noted that the principles of the present invention may be implemented in any system. Furthermore, while this description has been written in terms of a system for heating, ventilation, and air conditioning, the teachings of the present invention are equally suitable to any systems where the functionality may be employed. Therefore, it is the object of the appended claims to cover all such variations and modifications as come within the true spirit and scope of the invention.

What is claimed is:

1. A system comprising:
   a supply air stream configured to supply a supply air to a controlled environment;
   a return air stream configured to remove a return air from the controlled environment;
   a partition configured to separate the supply air stream and the return air stream;
   a bypass damper disposed between the supply air stream and the return air stream;
   an energy recovery ventilator;
   a heat recovery ventilator;
   a first direct expansion coil configured to increase or decrease a temperature of an air in a supply air zone, the first direct expansion coil disposed between the energy recovery ventilator and the heat recovery ventilator;
   a first refrigerant flow controlling condensing unit configured to directly or indirectly transfer refrigerant to the first direct expansion coil;
   a second direct expansion coil configured to increase or decrease a temperature of an air in a return air zone and configured to increase or decrease the temperature of the air in the supply air zone, the second direct expansion coil disposed between the heat recovery ventilator and the controlled environment;
   a second refrigerant flow controlling condensing unit configured to directly or indirectly transfer refrigerant to the second direct expansion coil;
   a first branch selector unit, the first branch selector unit disposed between the second direct expansion coil and the second refrigerant flow controlling condensing unit;
   a fan coil unit configured to increase or decrease a temperature of air wherein the system is configured to selectively distribute a heat recovered from the fan coil unit to the second direct expansion coil;
   a second branch selector unit, the second branch selector unit disposed between the first branch selector unit and the fan coil unit; and
   a third branch selector unit, the third branch selector unit disposed between the first branch selector unit and the first refrigerant flow controlling condensing unit.

2. The system of claim 1 wherein the second direct expansion coil is disposed in the supply air zone.

3. The system of claim 1 wherein the second direct expansion coil is disposed in the return air zone.

4. The system of claim 1 further comprising:
   an air exhauster configured to transfer the return air into an uncontrolled environment.

5. The system of claim 1 further comprising:
an air supplier configured to transfer the supply air into the controlled environment.

6. The system of claim 1 wherein the second direct expansion coil is configured to facilitate a defrost of the energy recovery ventilator.

7. The system of claim 1 wherein the second direct expansion coil is configured to facilitate a defrost of the first direct expansion coil.

8. The system of claim 1 wherein the energy recovery ventilator is an enthalpy wheel.

9. The system of claim 1 wherein the energy recovery ventilator is a desiccant wheel.

10. The system of claim 1 wherein the energy recovery ventilator is a fixed-plate heat exchanger.

11. The system of claim 1 wherein the energy recovery ventilatory is configured to recover sensible energy and latent energy.

12. The system of claim 1 wherein the heat recovery ventilator is configured to recover sensible energy.

13. The system of claim 1 wherein the first direct expansion coil is configured to increase or decrease a temperature of the supply air stream.

14. The system of claim 1 wherein the second direct expansion coil is configured to increase or decrease a temperature of the supply air stream.

15. The system of claim 1 wherein the second direct expansion coil is configured to increase or decrease a temperature of the return air stream.

16. The system of claim 1 wherein the system is configured to distribute the heat recovered from the fan coil unit to the second direct expansion coil according to one or more distribution variables that define conditions for distributing the heat recovered from the fan coil unit.

17. The system of claim 1 wherein the system is configured to distribute the heat recovered from the fan coil unit to the second direct expansion coil according to one or more distribution priorities that define relative priorities for distributing the heat recovered from the fan coil unit.

18. The system of claim 1 wherein the first refrigerant flow controlling condensing unit is a variable refrigerant volume condensing unit.

19. The system of claim 1 wherein the second refrigerant flow controlling condensing unit is a variable refrigerant volume condensing unit.

20. The system of claim 1 wherein the first refrigerant flow controlling condensing unit is a variable refrigerant flow condensing unit.

* * * * *